(12) United States Patent
Bhalla et al.

(10) Patent No.: US 12,037,297 B2
(45) Date of Patent: Jul. 16, 2024

(54) PROCESS FOR MANUFACTURING NUTRITIONAL COMPOSITIONS FOR PLANTS AND SOILS

(71) Applicant: Envirokure, Incorporated, Philadelphia, PA (US)

(72) Inventors: Sushil K. Bhalla, Schwenksville, PA (US); Devon K. Hooper, Leesburg, NJ (US)

(73) Assignee: Envirokure Inc., Philadelphia, PA (US)

( * ) Notice: Subject to any disclaimer, the term of this patent is extended or adjusted under 35 U.S.C. 154(b) by 492 days.

(21) Appl. No.: 17/262,166

(22) PCT Filed: Jul. 30, 2019

(86) PCT No.: PCT/US2019/044200
§ 371 (c)(1),
(2) Date: Jan. 21, 2021

(87) PCT Pub. No.: WO2020/028403
PCT Pub. Date: Feb. 6, 2020

(65) Prior Publication Data
US 2021/0331987 A1    Oct. 28, 2021

Related U.S. Application Data

(60) Provisional application No. 62/713,325, filed on Aug. 1, 2018.

(51) Int. Cl.
*C05F 17/20* (2020.01)
*C05F 3/00* (2006.01)
(Continued)

(52) U.S. Cl.
CPC ............... *C05F 17/20* (2020.01); *C05F 3/00* (2013.01); *C05F 17/40* (2020.01); *C05F 17/70* (2020.01); *C05F 17/979* (2020.01); *C05G 5/20* (2020.02)

(58) Field of Classification Search
None
See application file for complete search history.

(56) References Cited

U.S. PATENT DOCUMENTS

| 3,718,451 A | 2/1973 | Baumann |
| 3,865,568 A | 2/1975 | Kratzer |

(Continued)

FOREIGN PATENT DOCUMENTS

| CA | 2617143 | * | 2/2007 | ............... B03B 9/06 |
| CN | 106986720 A | | 7/2017 | |

(Continued)

OTHER PUBLICATIONS

Calvo et al., "Agricultural uses of plant biostimulants," Plant Soil 383:3-41 (2014).

(Continued)

*Primary Examiner* — Wayne A Langel
(74) *Attorney, Agent, or Firm* — Potter Anderson & Corroon LLP

(57) ABSTRACT

Processes for manufacturing compositions for plants and soils, such as liquid biofertilizers and solid biostimulants, from animal manure is disclosed. The processes include the delivery of pure oxygen or oxygen-enriched air to a liquid fraction of animal manure and further include subjecting the liquid fraction to an autothermal thermophilic aerobic bioreaction. Nutritional compositions to enhance the effectiveness of synthetic fertilizers in conventional agriculture and/or for use in organic farming that are manufactured by these processes are also disclosed.

17 Claims, 8 Drawing Sheets

(51) Int. Cl.
*C05F 17/40* (2020.01)
*C05F 17/70* (2020.01)
*C05F 17/979* (2020.01)
*C05G 5/20* (2020.01)

(56) References Cited

U.S. PATENT DOCUMENTS

| | | |
|---|---|---|
| 3,939,280 A | 2/1976 | Kamemaat |
| 3,966,450 A | 6/1976 | O'Neill et al. |
| 4,160,656 A | 7/1979 | Junkermann |
| 4,311,511 A | 1/1982 | Graefe |
| 4,459,149 A | 7/1984 | Moran et al. |
| 5,174,805 A | 12/1992 | Masuda |
| 5,354,349 A | 10/1994 | Inoue |
| 5,393,317 A | 2/1995 | Robinson |
| 5,401,291 A | 3/1995 | Inoue |
| 5,501,718 A | 3/1996 | Bandurski |
| 5,730,772 A | 3/1998 | Staples |
| 6,364,926 B1 | 4/2002 | Gryzik et al. |
| 6,764,661 B1 | 7/2004 | Girard |
| 7,647,311 B2 | 1/2010 | Tenorio et al. |
| 7,662,205 B2 | 2/2010 | Burnham |
| 8,409,620 B2 | 4/2013 | Livingston |
| 8,673,046 B1 | 3/2014 | Szogi et al. |
| 9,688,584 B2 | 6/2017 | Bhalla et al. |
| 2002/0108904 A1 | 8/2002 | Blackburn |
| 2002/0182710 A1 | 12/2002 | Horn et al. |
| 2003/0041638 A1 | 3/2003 | Lamour et al. |
| 2004/0031302 A1 | 2/2004 | Eswaran et al. |
| 2004/0040516 A1 | 3/2004 | Jensen |
| 2004/0065127 A1 | 4/2004 | Connell |
| 2004/0182780 A1 | 9/2004 | Lee |
| 2004/0265266 A1 | 12/2004 | Champ et al. |
| 2005/0193790 A1 | 9/2005 | Hartman |
| 2006/0254331 A1 | 11/2006 | Burnham |
| 2007/0039362 A1 | 2/2007 | Macura |
| 2009/0188290 A1 | 7/2009 | Marler |
| 2009/0193863 A1 | 8/2009 | Szogi et al. |
| 2010/0288003 A1 | 11/2010 | Burnham et al. |
| 2010/0303551 A1 | 12/2010 | Chang |
| 2011/0079060 A1 | 4/2011 | Hackett et al. |
| 2011/0247378 A1 | 10/2011 | Begley et al. |
| 2011/0303157 A1 | 12/2011 | Laubenstein |
| 2012/0122196 A1 | 5/2012 | Johnson |
| 2012/0269905 A1 | 10/2012 | Mokhov et al. |
| 2013/0019645 A1 | 1/2013 | Crabtree et al. |
| 2013/0186155 A1 | 7/2013 | Blaine |
| 2014/0196512 A1 | 7/2014 | Shaimukhambetova |
| 2014/0338411 A1 | 11/2014 | Nunn |
| 2015/0259259 A1* | 9/2015 | Bhalla ................ A01C 3/00 71/21 |
| 2016/0318819 A1 | 11/2016 | Josse et al. |
| 2017/0349500 A1 | 12/2017 | Bhalla et al. |

FOREIGN PATENT DOCUMENTS

| | | | | |
|---|---|---|---|---|
| CN | 108046856 A | * | 5/2018 | ............ C05F 17/00 |
| GB | 2199820 A | * | 7/1988 | ............ C05F 7/00 |
| WO | WO 99/46209 A1 | | 9/1999 | |
| WO | WO 2013/028776 A1 | | 8/2012 | |
| WO | WO 2013/003883 A1 | * | 1/2013 | ............ C02F 3/32 |
| WO | WO 2017/112605 A1 | | 6/2017 | |

OTHER PUBLICATIONS

Du Jardin, "Plant biostimulants: Definition, concept, main categories and regulation," Scientia Horticulturae 196:3-14 (2015).

Khorassani et al., "Citramalic acid and salicylic acid in sugar beet root exudates solubilize soil phosphorus," BMC Plant Biol. 11:121 (2011).

Legault et al., "Aerobic Digestion of Poultry Manure to Produce Biologically Active Greenhouse Nutrient Solutions," Alberta Agriculture and Rural Development.

Mochalov et al., "The Use of Stimulators Made of Aqueous Extract from Bark and Chicken Manure Compost and Heteroauxin when Pricking Out Containerized Pine Seedlings." Lesnoy Zhurnal, 2015(5):67-76 (2015). See pp. 74-75 for English Abstract.

Nishizawa et al., "Galactinol and Raffinose Constitute a Novel Function to Protect Plants from Oxidative Damage," Plant Physiol. 147(3):1251-1263 (2008).

Nofziger-Dasupta, "Innovative Aerobic Technology for Organic Fertilizer," Envirokure, Inc. (Dec. 17, 2014).

Vallad & Goodman, "Systemic Acquired Resistance and Induced Systemic Resistance in Conventional Agriculture," Crop Sci. 44:1920-1934 (2004).

Vranova et al., "Non-protein amino acids: plant, soil and ecosystem interactions," Plant Soil 342:31-48 (2011).

Zhao, "Auxin biosynthesis and its role in plant development," Ann. Rev. Plant Biol. 61:49-64 (2010).

Indian Space Research Organization. "New Microorganisms Discovered In Earth's Stratosphere." ScienceDaily. ScienceDaily, Mar. 18, 2009, available at https://www.sciencedaily.com/releases/2009/03/090318094642.htm.

Katovich, "Weed Seed Survival in Livestock Systems" U. Minn. Extension Servs. & U. Wis. Extension, available at https://www.extension.umn.edu/agriculture.

Mulvaney, "Synthetic Nitrogen Fertilizers Deplete Soil Nitrogen: A Global Dilemma for Sustainable Cereal Production" J. Environ. Qual. 38(6):2295-2314 (2009).

NASS Crop Production 2017 Summary (U.S.D.A. 2018).

Okuda, "Biological detoxification of waste house wood hydrosylate using Ureibacillus thermosphaericus for bioethanol production" J. Biosc. & Bioeng. 106(2):128-133 (2008).

Poudel, "Thermotolerant *Bacillus kokeshilformis* sp. nov. isolated from marine animal resources compost" Int. J. Systematic & Evol. Microbiol. 64:2668-2674 (2014).

Weisenburger, "Human Health Effects of Agrichemical Use" Hum. Pathol. 24(6):571-576 (1993).

21 C.F.R. § 112.51 (2020).

International Search Report and Written Opinion in International Patent Application No. PCT/US2019044200, mailed Nov. 8, 2019.

* cited by examiner

PROCESS FOR MANUFACTURING NUTRITIONAL COMPOSITIONS FOR PLANTS AND SOILS

CROSS REFERENCE TO RELATED APPLICATIONS

This is a U.S. national filing, pursuant to 35 U.S.C. § 371, of International Application No. PCT/US2019/044200, filed Jul. 30, 2019, which claims benefit of U.S. Provisional Application No. 62/713,325, filed Aug. 1, 2018, the entire contents of which are incorporated by reference herein.

FIELD OF THE INVENTION

The present invention relates generally to fertilizers and compositions useful for promoting plant growth and healthy soil structure. In particular, processes for manufacturing such fertilizers and compositions are disclosed.

BACKGROUND OF THE INVENTION

Two main categories of crop input products are used in agriculture: fertilizers and pesticides. A fertilizer is typically described as any organic or inorganic material of natural or synthetic origin that is added to supply one or more nutrients essential to the growth of plants. Fertilizers provide, in varying proportions, the macronutrients, secondary nutrients, and micronutrients required or beneficial for plant growth.

During the last century, there has been extensive use of synthetic fertilizers and pesticides in agriculture. It is now well recognized that the use of synthetic fertilizers adversely impacts the physical qualities of soil diminishing its ability to support plant productivity. In addition, the adverse impacts of these chemicals on environment and humans are being recognized (see, e.g., Weisenberger, D. D., 1993, "Human Health Effects of Agrichemical Use," Hum. Pathol. 24(6): 571-576). Moreover, numerous studies have shown that as soil carbon declines, significant increases in chemical fertilizers are needed to maintain yields, while leaving an estimated 67% of seed potential unrealized (see, e.g., Mulvaney R. L., et al., 2009, J. Environ. Qual. 38(6):2295-2314; Tollenaar, M., 1985, Proceedings of the Conference on Physiology, Biochemistry and Chemistry Associated with Maximum Yield Corn, Foundation for Agronomic Research and Potash and Phosphate Institute. St. Louis, MO, 11-12; NASS Crop Production 2017 Summary (U.S.D.A. 2018)). Accordingly, the recognition of the often-detrimental effect of synthetic fertilizers and pesticides on soil ecology has provided impetus for expanding interest in sustainable and regenerative crop production, including the use of fertilizers, soil stimulants, and pesticides of natural and/or biological origin. Thus, the need for improvements in agriculture and crop protection is apparent in both the organic and conventional agriculture sectors and highlights the need for biologic treatments that can replace or supplement conventional synthetic fertilizers or be used in combination with conventional chemical herbicides/pesticides to maximize crop yield while maintaining soil integrity.

One class of materials being considered for use in the agricultural industry as an alternative to synthetic fertilizers are agricultural biologics, such as biostimulants, biofertilizers, and biopesticides. Biofertilizers and biostimulants are used in the agricultural industry to add nutrients to plants and soil through the natural processes of nitrogen fixation, phosphorus solubilization, and plant growth stimulation through the synthesis of growth-promoting substances. Biofertilizers can be expected to reduce the use of chemical fertilizers and pesticides and, in conventional farming, be used in combination with pesticides to reduce, e.g., chemical-induced stress on the plants themselves. The microorganisms in biofertilizers restore the soil's natural nutrient cycle and build soil organic matter. Through the use of biofertilizers, healthy plants can be grown, while enhancing the sustainability and the health of the soil. In addition, certain microorganisms referred to as plant growth promoting rhizobacteria (PGPR) are extremely advantageous in enriching soil fertility and fulfilling plant nutrient requirements by supplying the organic nutrients through microorganisms and their byproducts. Hence, biofertilizers do not contain any chemicals which are harmful to living soil.

In addition to conferring benefits to the soil and rhizosphere, PGPRs can influence the plant in a direct or indirect way. For instance, they can increase plant growth directly by supplying nutrients and hormones to the plant. Examples of bacteria which have been found to enhance plant growth, include certain mesophiles and thermophiles, including thermophilic members of genera such as *Bacillus, Ureibacillus, Geobacillus, Brevibacillus* and *Paenibacillus*, all known to be prevalent in poultry manure compost. Mesophiles reported to be beneficial for plant growth, include those belonging to the genera *Bacillus, Serratia, Azotobacter, Lysinibacillus* and *Pseudomonas*.

PGPRs are also able to control the number of pathogenic bacteria through microbial antagonism, which is achieved by competing with the pathogens for nutrients, producing antibiotics, and the production of anti-fungal metabolites. Besides antagonism, certain bacteria-plant interactions can induce mechanisms in which the plant can better defend itself against pathogenic bacteria, fungi and viruses. One mechanism is known as induced systemic resistance (ISR), while another is known as systemic acquired resistance (SAR) (see, e.g., Vallad, G. E. & R. M. Goodman, 2004, Crop Sci. 44:1920-1934). The inducing bacteria triggers a reaction in the roots that creates a signal that spreads throughout the plant, resulting in the activation of defense mechanisms, such as reinforcement of the plant cell wall, production of antimicrobial phytoalexins and the synthesis of pathogen related proteins. Some of the components or metabolites of bacteria that can activate ISR or SAR include lipopolysaccharides (LPS), flagella, salicylic acid, and siderophores. Thus, there remains a need for nutrient- and PGPR-rich biofertilizers.

In addition to containing PGPR, biofertilizers may contain other types of bacteria, algae, fungi, or a combination of these microorganisms and include nitrogen fixing microorganisms (e.g., *Azotobacter, Clostridium, Anabaena, Nostoc, Rhizobium, Anabaena azollae*, and *Azospirillum*), phosphorous solubilizing bacteria and fungi (e.g., *Bacillus subtilis, Psuedomonas striata, Penicillium* sp., *Aspergillus awamori*), phosphorous mobilizing fungi (e.g., *Glomus* sp., *Scutellospora* sp., *Laccaria* sp., *Pisolithus* sp., *Boletus* sp., *Amanita* sp., and *Pezizella ericae*), and silicate and zinc solubilizers (e.g., *Bacillus* sp.). However, while biofertilizers may increase the availability of plant nutrients and contribute to soil maintenance as compared to conventional chemical fertilizers, finding cost-effective ways to produce biofertilizers enriched with a suitable population of beneficial microorganisms that are free from microbial contamination and other contaminants and that can be used with existing application methods and technology remains a relatively unmet need in the industry.

One particular source of biofertilizer and biostimulant compositions is animal waste. Indeed, animal manure and, in particular, nutrient- and microbe-rich poultry manure, has been a subject of extensive research regarding its suitability as a biofertilizer. It is well established through academic research and on-farm trials that poultry manure can cost-effectively provide all the macro and micro nutrients required for plant growth, as well as certain plant growth promoting rhizobacteria. However, these benefits are contingent on the elimination of plant and human pathogens that are associated with chicken manure. Moreover, significant concerns from the use of raw manure include increased potential for nutrient run off and leaching of high soil phosphorous, as well as transmittal of human pathogens to food. Importantly, U.S. producers and farmers alike must ensure that their manure-based biofertilizers meet the stringent safety regulations for unrestricted use of a manure-based input promulgated by the FDA. See, for example, 21 C.F.R. § 112.51 (2016).

Another issue negatively impacting the agricultural industry is field contamination by weed seeds. Further, manure-based application, especially raw manure application, may actually contribute to weed seed contamination as undigested weed seeds may be present in the animal waste (see Katovich J. et al., "Weed Seed Survival in Livestock Systems," U. Minn. Extension Servs. & U. Wis. Extension, available at https://www.extension.umn.edu/agriculture). Weed seed contamination often leads to reduced crop yields prompting the need for increased application of chemical herbicides, which may have a negative impact on both plant and human health. Weed seed contamination is especially problematic in the organic agriculture industry where the application of synthetic herbicides is not permitted forcing famers to rely on mechanical cultivators to control weed growth. As composting has been shown to reduce the total volume of runoff and soil erosion as well as the potential for pathogen and weed seed contamination, many states now require poultry manure to be composted prior to field application, leading to advances in composting processes.

Composting can be described as the biological decomposition and stabilization of organic material. The process produces heat via microbial activity, and produces a final product that is stable, substantially free of pathogens and weed seeds. As the product stabilizes, odors are reduced and pathogens eliminated, assuming the process is carried to completion. Most composting is carried out in the solid phase.

The benefits of composting include: (1) enriching soil with PGPR, (2) reduction of microbial and other pathogens and killing of weed seeds; (3) conditioning the soil, thereby improving availability of nutrients to plants; (4) potentially reducing run-off and soil erosion; (5) stabilizing of volatile nitrogen into large protein particles, reducing losses; and (6) increasing water retention of soil. However, the process is time consuming and labor intensive. Moreover, composting is not without significant obstacles including: (1) the requirement for a large surface area for efficient composting; (2) the need for heavy equipment to "turn" piles for thorough composting for commercial use; (3) difficulty in maintaining consistent, proper carbon to nitrogen ratios; (4) the need for uniform heating; (5) transportation of the bulky final product; and (6) the lack of consistency in the product and its application. Additionally, because nutrients are applied in bulk prior to planting, there is a significant potential for nutrients to be lost through run-off. There is also a significant potential for inconsistent decomposition and incomplete pathogen destruction. Furthermore, uneven nutrient distribution in field application is a concern. Lastly, solid compost cannot be used in hydroponics and drip irrigation.

With regard to this last drawback, organic, and conventional growers alike have utilized compost leachate (compost tea) as a liquid fertilizer. The leachate is produced by soaking well-composted material in water and then separating the solid from the liquid leachate. While such liquid material can be utilized in drip irrigation or foliar application, its production remains time consuming and labor intensive, and the liquid product suffers from the same drawbacks as solid compost in that it may still contain pathogenic organisms and its nutrient content is inconsistent. Thus, any residual pathogenic organisms present in the compost tea presents a risk for pathogen replication and contamination and thus may not pass muster under the applicable and stringent federal health and safety regulations.

Some organic fertilizers include fish-based and plant protein-based fertilizers. Fish emulsion products are typically produced from whole salt-water fish and carcass products, including bones, scales and skin. The fish are ground into a slurry, then heat processed to remove oils and fish meal. The liquid that remains after processing is referred to as the fish emulsion. The product is acidified for stabilization and to prevent microbial growth. Fish hydrolysate fertilizers are typically produced from freshwater fish by a cold enzymatic digestion process. While fish fertilizers can provide nutritional supplementation to plants and soil microorganisms, they are difficult to use, in part due to their high acidity and oil-based composition in some instances, which can clog agricultural equipment. Plant protein-based fertilizers are typically produced by hydrolysis of protein-rich plant materials, such as soybean, and are an attractive alternative for growers and gardeners producing strictly vegan products, for instance. However, due to their sourcing, these products can be expensive. Furthermore, none of the above-described fertilizers is naturally biologic: beneficial microorganisms must be added to them.

Nutrient rich liquid and solid biofertilizers can be produced from poultry manure by utilizing aerobic microorganisms that break down the undesired organic materials, such as the processes described in U.S. Pat. No. 9,688,584 B2 and international patent application publication No. WO 2017/112605 A1. However, existing methods of processing poultry manure to produce biofertilizer suffer from a number of drawbacks that include incomplete decomposition of organic matter and excess foaming of the bioreactor equipment. The latter causes significant disruption of airflow and subsequent incomplete decomposition of organic material, which typically results in a liquid fertilizer product that clogs sprayers and other field application equipment thereby disrupting farming program operations and increasing costs.

Thus, there remains a need in the art for more efficient processes for the manufacture of biologically-derived products, which can provide superior plant nutrition and soil conditioning, while at the same time being safe, easy to use and cost-effective. Such products would provide highly advantageous alternatives to synthetic products currently in use, such as diammonium phosphate, monoammonium phosphate, and urea-ammonium nitrate, and would satisfy growers' requirements for standardization and reliability.

SUMMARY OF THE INVENTION

Described herein are processes for manufacturing compositions for application to plants and soils. In particular, the processes produce solid and liquid compositions made from animal waste, such as poultry manure. In one aspect, provided herein is a process for manufacturing an organic fertilizer product from animal waste, and includes the steps of adjusting the pH of the animal waste to about 5 to about 8 to produce a stabilized animal waste composition; adjusting moisture content of the animal waste composition to at least about 75 wt % to produce an aqueous slurry; separating a substantially solid component and a substantially liquid component of the aqueous slurry; and subjecting the substantially liquid component to an autothermal thermophilic aerobic bioreaction. Moreover the autothermal thermophilic aerobic bioreactions includes the delivery of pure oxygen or oxygen enriched air to the substantially liquid component to maintain the substantially liquid component under aerobic conditions suitable for the growth of thermophilic bacteria for a first period of time; and maintaining the substantially liquid component at a temperature suitable for the growth of thermophilic bacteria for a second period of time. In addition, the stabilized animal waste composition, the aqueous slurry and the substantially liquid component are maintained at a pH of at about 5 to about 8 throughout the process.

In another embodiment, the process further includes the step of subjecting the substantially solid component to drying to adjust the moisture content of the substantially solid component to less than about 15% to produce a dried solid product. In some embodiments, the first period of time and the second period of time occur substantially simultaneously. In other embodiments, the process includes subjecting the stabilized animal waste composition, the aqueous slurry, or both the stabilized animal waste composition and aqueous slurry to mixing or chopping.

In one embodiment, the process includes the delivery of pure oxygen or oxygen enriched air to the aqueous slurry for a third period of time to reduce the concentration of anaerobic compounds in the aqueous slurry. In another embodiment, the aqueous slurry comprises a residual dissolved oxygen concentration of at least about 1 parts per million. In certain embodiments, the residual dissolved oxygen concentration is at least about 2 parts per million. In addition, the anaerobic compounds may include hydrogen sulfide. In some embodiments, the pure oxygen or oxygen enriched air is delivered by injection via one or more spargers having a pore grade in the range from about 1 micron to about 3 microns. In another embodiment, the pure oxygen or oxygen enriched air is injected into the substantially liquid component at a rate of about 0.5 CFM to about 1.5 CFM per 1,000 gallons. In still other embodiments, the pure oxygen or oxygen enriched air is injected into the aqueous slurry at a rate of about 0.25 CFM to about 1.5 CFM per 10,000 gallons.

In various embodiments, the animal waste comprises poultry manure. For instance, the poultry manure may be chicken manure. Moreover, in some aspects, the pH of the animal waste is adjusted by adding an acid. In some instances, the aqueous slurry is heated to between about 50° C. to about 80° C. before the separating step. In other embodiments, the autothermal thermophilic aerobic bioreaction comprises heating the substantially liquid component to a temperature of at least about 45° C. for the second period of time.

In any of the embodiments described above, the aerobic conditions in the autothermal thermophilic aerobic bioreaction may have a dissolved oxygen level of between about 2 mg/l and about 6 mg/l. In some embodiments, the stabilized animal waste composition, the aqueous slurry and the substantially liquid component are maintained at a pH between about 5.5 and about 7 throughout the process.

In one exemplary embodiment in the process, the third period of time is at least about 15 minutes. In other embodiments, the third period of time is at least about 1 hour. In the process described above, both the first period of time and the second period of time may be at least about 1 day in some instances. In still other embodiments, both the first period of time and the second period of time are at least about 3 days.

In another embodiment, the process includes an additional step prior to the autothermal aerobic thermophilic reaction, which includes subjecting the substantially liquid component to an initial autothermal aerobic mesophilic reaction that includes (i) delivery of pure oxygen or oxygen enriched air to the substantially liquid component to maintain the substantially liquid component under aerobic conditions suitable for the growth of mesophilic bacteria; and (ii) maintaining the substantially liquid component at a temperature suitable for the growth of mesophilic bacteria. In this embodiment, the initial autothermal aerobic mesophilic reaction is maintained for at least about 1 hour. In other embodiments, the initial autothermal aerobic mesophilic reaction is maintained for about 1 to 3 days.

In another aspect of the invention, provided herein is a liquid fertilizer composition for application to plants and soils, wherein the liquid fertilizer composition is produced by any of the processes described above. In some embodiments, the composition includes at least one additive, which may be a macronutrient or a micronutrient. In other embodiments, the composition is formulated for application to soil or a medium in which a plant is growing or will be grown. In yet other embodiments, the composition is formulated for application to a seed or plant part. In still others, it is suitable for use in an organic program. In some embodiments, the composition is admixed with a synthetic or chemical fertilizer for use in conventional agriculture. In others, the composition is admixed with a chemical pesticide and/or chemical herbicide for use in conventional agriculture.

Another aspect of the present invention features a process for manufacturing a nutritional composition from animal waste, which includes the steps of (a) adjusting the pH of the animal waste to less than about 7.5 to produce a stabilized animal waste composition; (b) adjusting moisture content of the stabilized animal waste to at least about 80 wt % to produce an aqueous animal waste composition; (c) separating a solid component and a liquid component of the aqueous animal waste composition; and (d) subjecting the separated liquid component to an autothermal thermophilic aerobic bioreaction (ATAB) for a first pre-determined time wherein. In this aspect, the ATAB of the separated liquid component occurs in one or more bioreactors comprising a pure oxygen or oxygen enriched air delivery system. In addition, the delivery system injects the pure oxygen or oxygen enriched air into the separated liquid component to maintain the separated liquid component under aerobic conditions suitable for the growth of thermophilic bacteria; and the temperature of the separated liquid component in the bioreactor is maintained at a temperature between about 45° C. to about 75° C. Moreover, the stabilized animal waste composition, the aqueous animal waste composition and the separated liquid component are maintained at a pH of less than about 7.5 throughout the process.

In an embodiment, the delivery system comprises one or more spargers having a pore grade in the range from about 1 micron to about 3 microns. In another embodiment, the pure oxygen or oxygen enriched air is injected into the separated liquid component at a rate of about 0.5 CFM to about 1.5 CFM per 1,000 gallons. In yet other embodiments, the first predetermined time is at least about 1 day. In still others, the first predetermined time is at least about 3 days.

In other various embodiments, the process includes the delivery of pure oxygen or oxygen enriched air to the aqueous animal waste composition for a second predetermined period of time. In some versions of these embodiments, the second predetermined time is at least about 15 minutes and the delivery of pure oxygen or oxygen enriched air is at a rate of about 0.25 CFM to about 1.5 CFM per 10,000 gallons.

In other embodiments, the temperature of the separated liquid component in the bioreactor is maintained at a temperature of at least about 60° C. for the predetermined period of time. In still others, the bioreactor comprises a level of foam that is less than about 1 foot for the first predetermined period of time.

In another embodiment, the process includes an additional step that is performed prior to the autothermal aerobic thermophilic reaction, which comprises subjecting the substantially liquid component to an initial autothermal aerobic mesophilic reaction that comprises (i) delivery of pure oxygen or oxygen enriched air to the substantially liquid component to maintain the substantially liquid component under aerobic conditions suitable for the growth of mesophilic bacteria; and (ii) maintaining the substantially liquid component at a temperature suitable for the growth of mesophilic bacteria. In this embodiment, the initial autothermal aerobic mesophilic reaction is maintained for at least about 1 hour. In other embodiments, the initial autothermal aerobic mesophilic reaction is maintained for about 1 to 3 days.

Other features and advantages of the invention will be apparent by references to the drawings, detailed description and examples that follow.

DETAILED DESCRIPTION OF THE INVENTION

Figure 1:
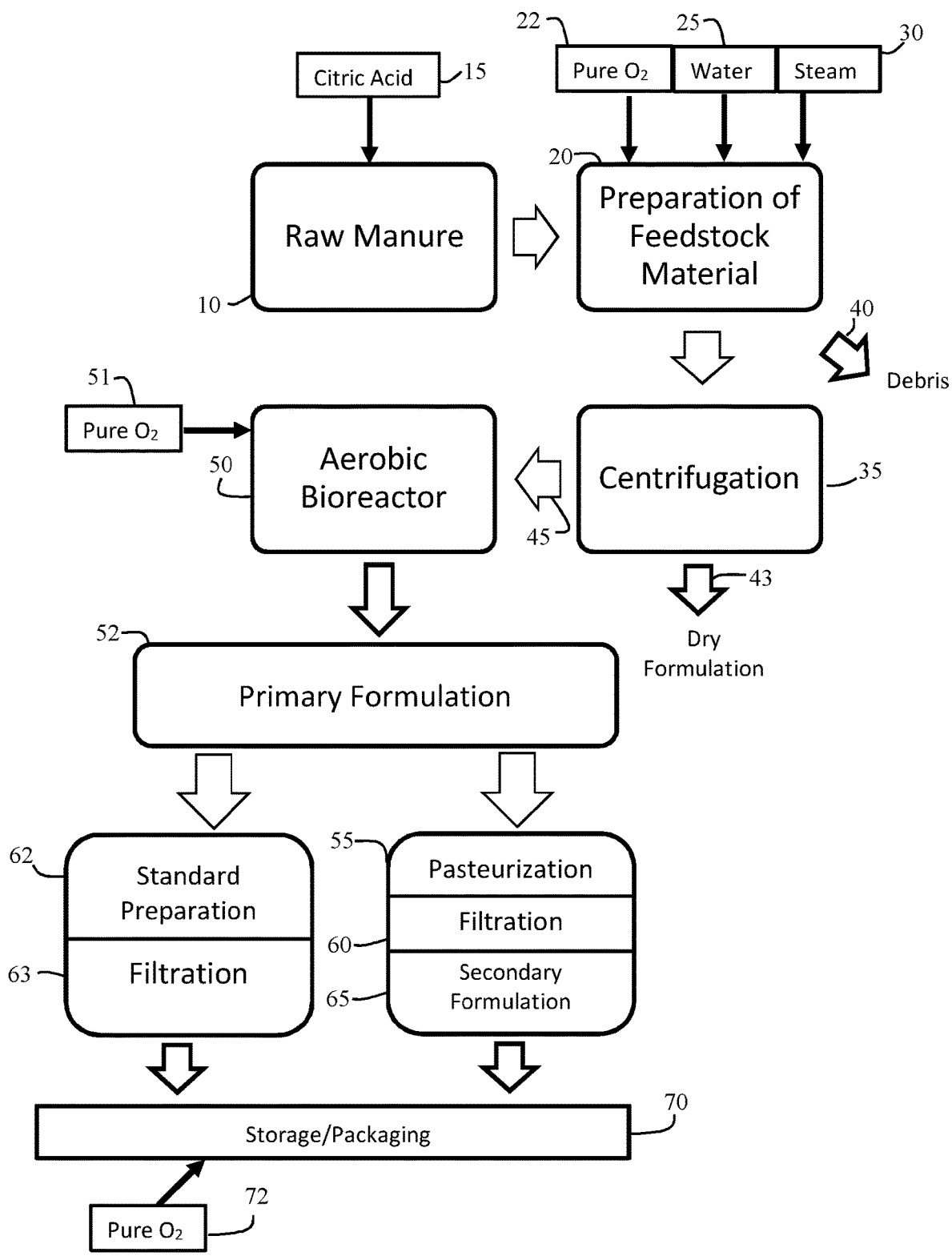
FIG. 1 is a block-diagram of an exemplary embodiment of nutritional composition production process.
Figure 2A:
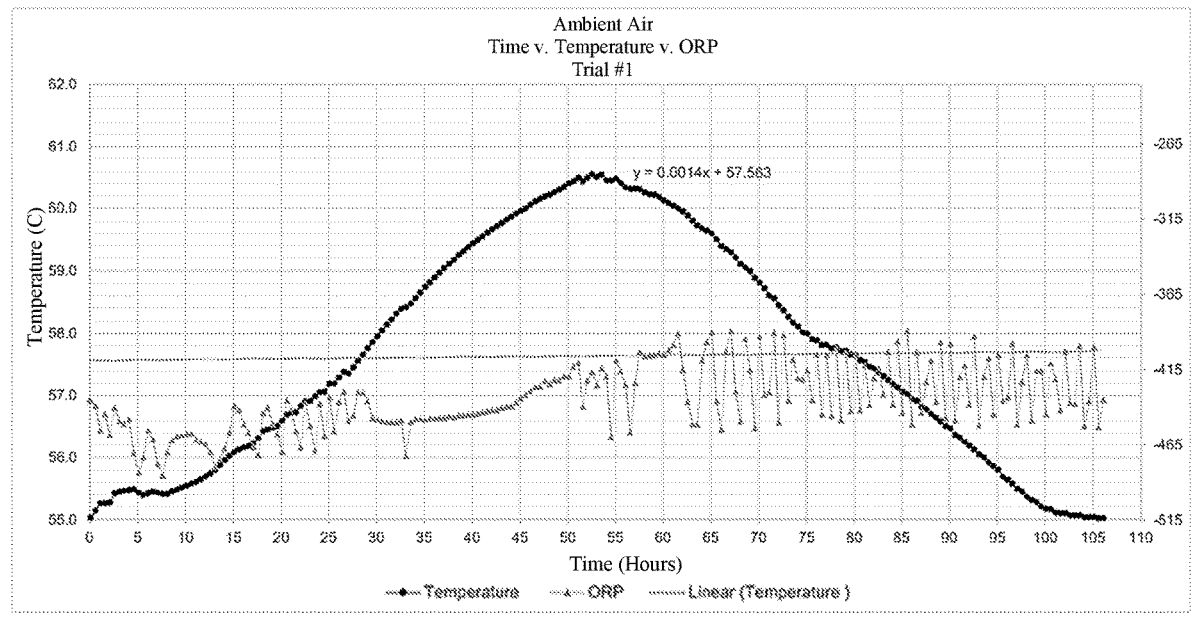
FIG. 2A is a graph showing the ATAB ORP in a bioreactor delivering ambient air. The y-axis depicts temperature in Celsius on the left and ORP in millivolts on the right, and the x-axis depicts time in hours. The circles represent temperature over time, whereas the triangles represent ORP over time.
Figure 2B:
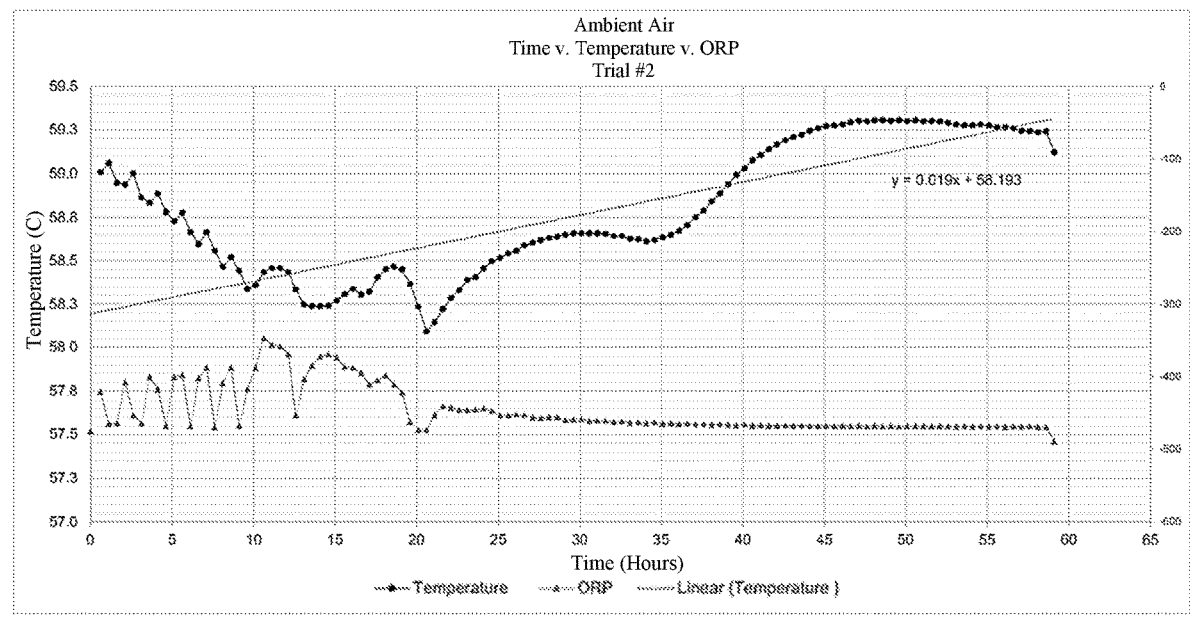
FIG. 2B is a graph showing the ATAB ORP in a bioreactor delivering ambient air. The y-axis depicts temperature in Celsius on the left and ORP in millivolts on the right, and the x-axis depicts time in hours. The circles represent temperature over time, whereas the triangles represent ORP over time.
Figure 2C:
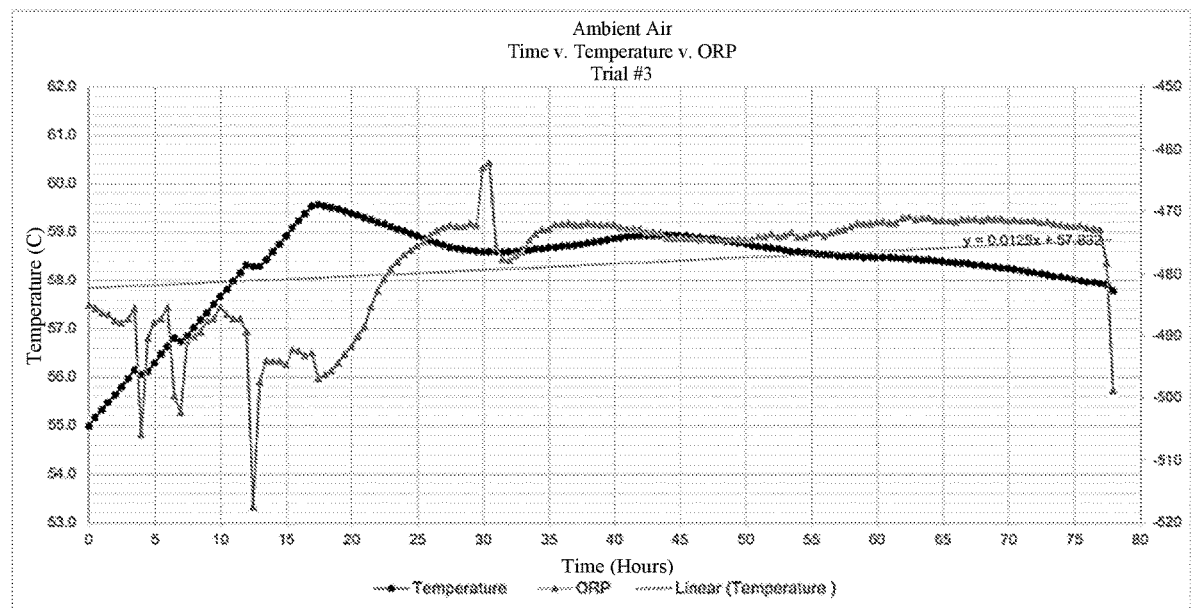
FIG. 2C is a graph showing the ATAB ORP in a bioreactor delivering ambient air. The y-axis depicts temperature in Celsius on the left and ORP in millivolts on the right, and the x-axis depicts time in hours. The circles represent temperature over time, whereas the triangles represent ORP over time.
Figure 2D:
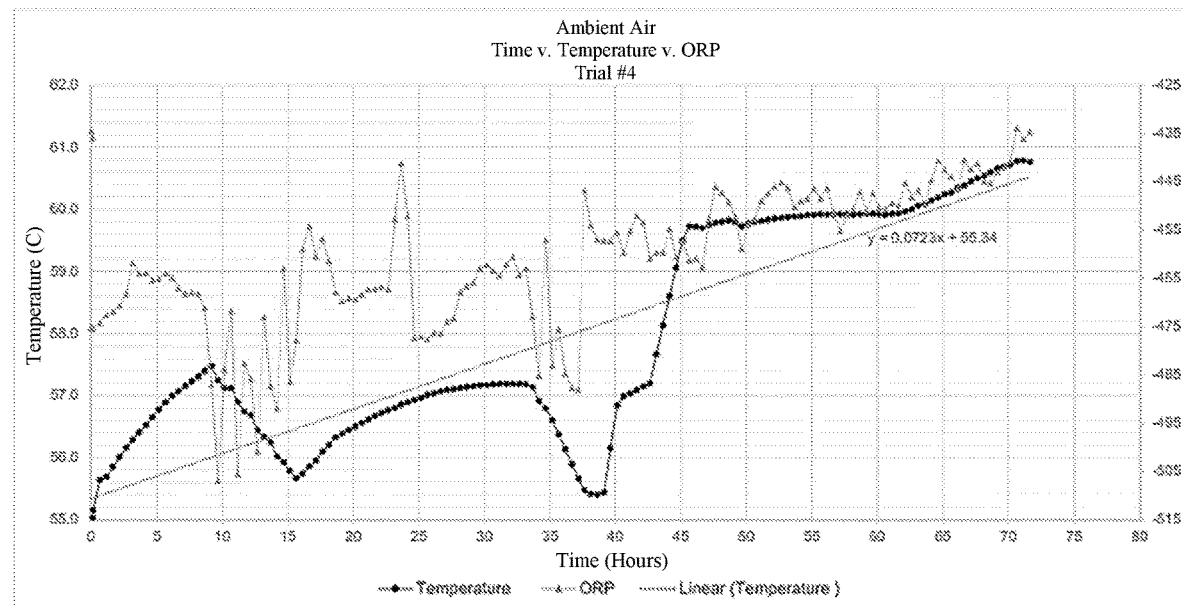
FIG. 2D is a graph showing the ATAB ORP in a bioreactor delivering ambient air. The y-axis depicts temperature in Celsius on the left and ORP in millivolts on the right, and the x-axis depicts time in hours. The circles represent temperature over time, whereas the triangles represent ORP over time.
Figure 2E:
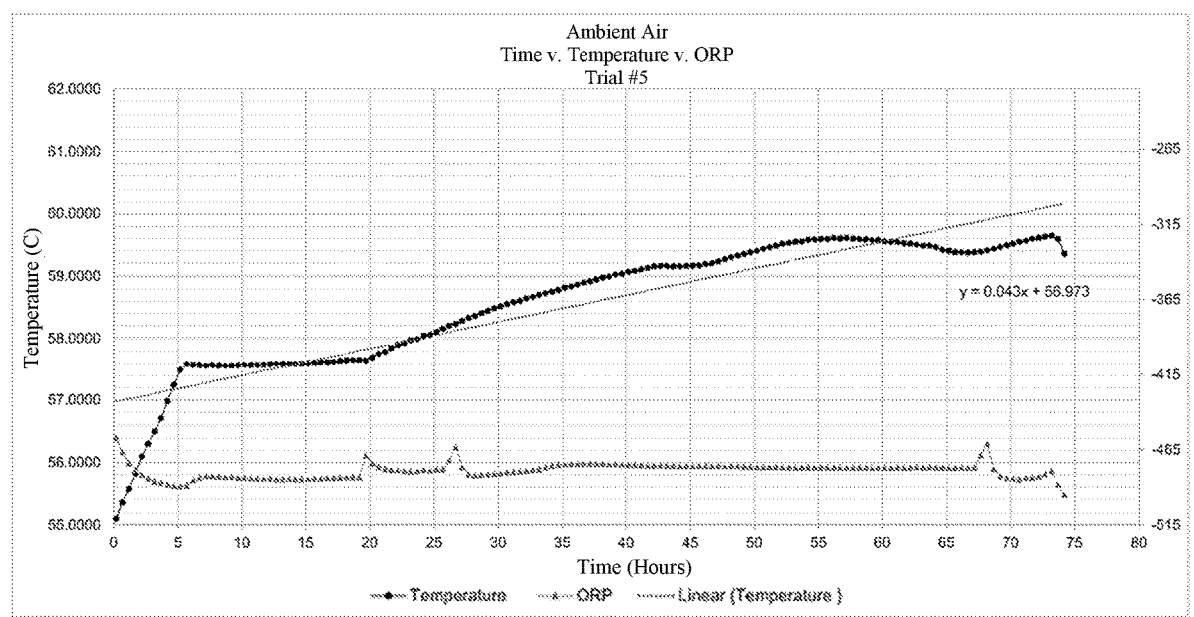
FIG. 2E is a graph showing the ATAB ORP in a bioreactor delivering ambient air. The y-axis depicts temperature in Celsius on the left and ORP in millivolts on the right, and the x-axis depicts time in hours. The circles represent temperature over time, whereas the triangles represent ORP over time.
Figure 3A:
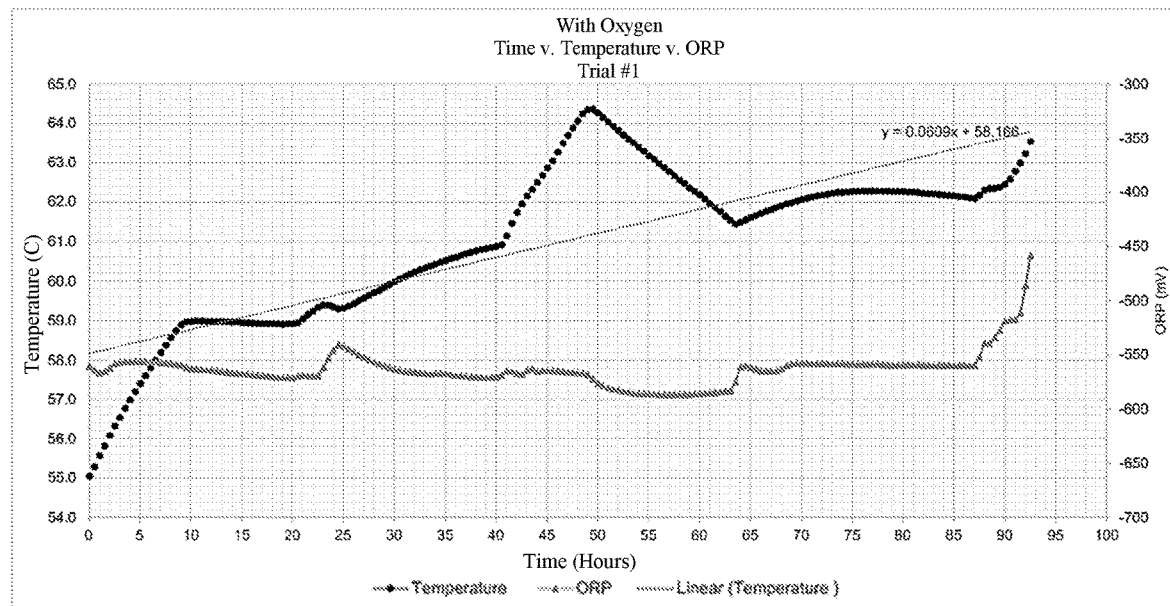
FIG. 3A is a graph showing the ATAB ORP in a bioreactor equipped with a pure oxygen delivery system. The y-axis depicts temperature in Celsius on the left and ORP in millivolts on the right, and the x-axis depicts time in hours. The circles represent temperature over time, whereas the triangles represent ORP over time.
Figure 3B:
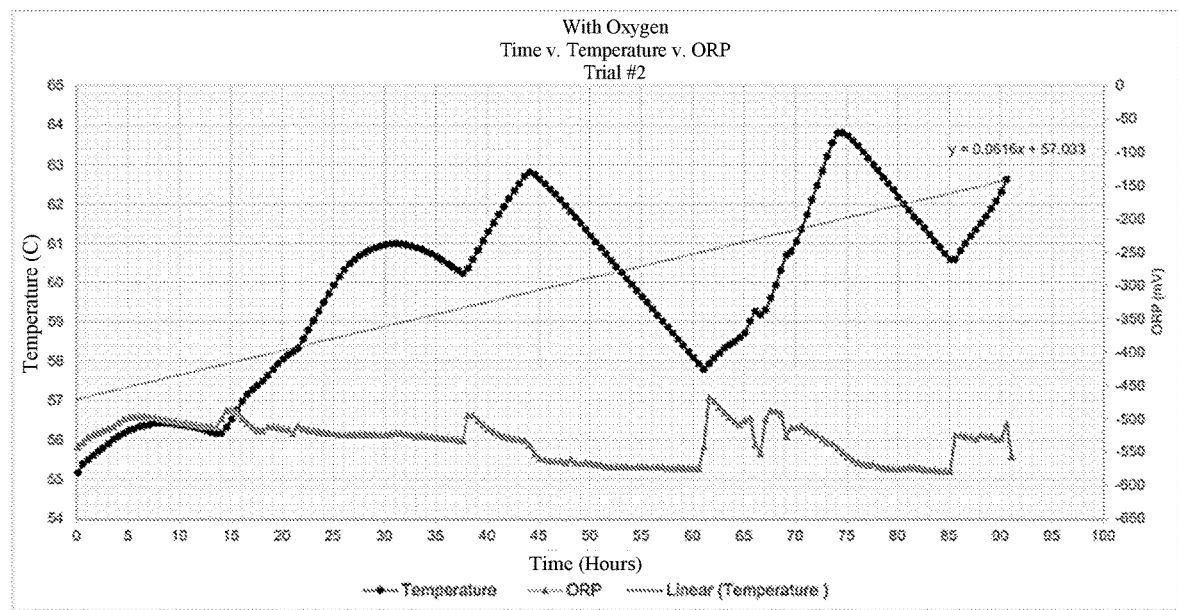
FIG. 3B is a graph showing the ATAB ORP in a bioreactor equipped with a pure oxygen delivery system. The y-axis depicts temperature in Celsius on the left and ORP in millivolts on the right, and the x-axis depicts time in hours. The circles represent temperature over time, whereas the triangles represent ORP over time.
Figure 3C:
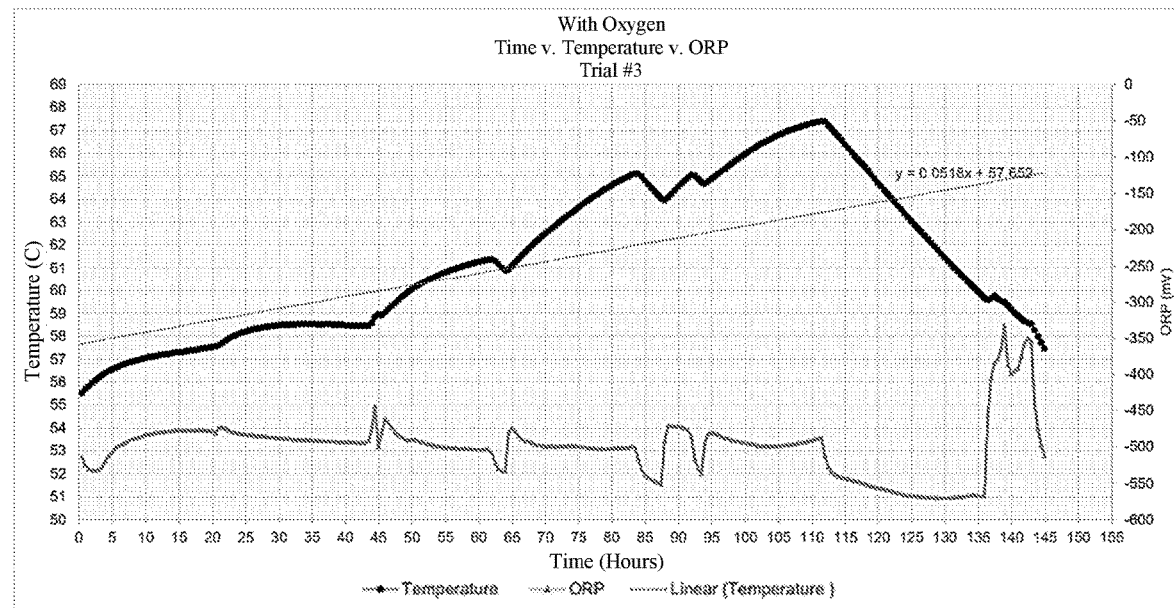
FIG. 3C is a graph showing the ATAB ORP in a bioreactor equipped with a pure oxygen delivery system. The y-axis depicts temperature in Celsius on the left and ORP in millivolts on the right, and the x-axis depicts time in hours. The circles represent temperature over time, whereas the triangles represent ORP over time.
Figure 3D:
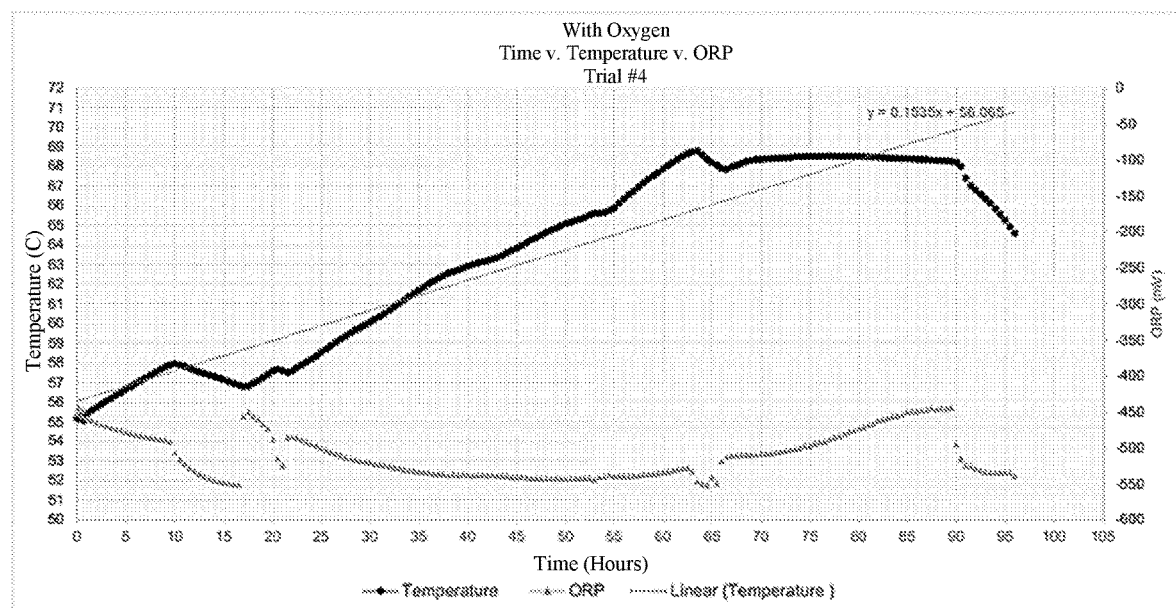
FIG. 3D is a graph showing the ATAB ORP in a bioreactor equipped with a pure oxygen delivery system. The y-axis depicts temperature in Celsius on the left and ORP in millivolts on the right, and the x-axis depicts time in hours. The circles represent temperature over time, whereas the triangles represent ORP over time.
Figure 3E:
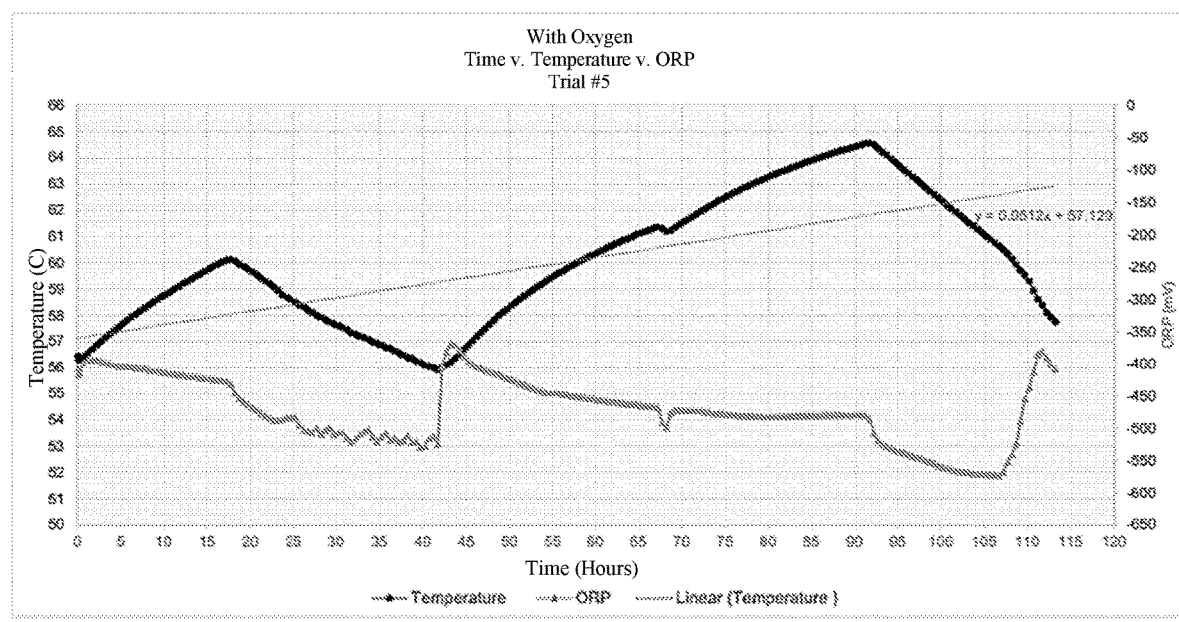
FIG. 3E is a graph showing the ATAB ORP in a bioreactor equipped with a pure oxygen delivery system. The y-axis depicts temperature in Celsius on the left and ORP in millivolts on the right, and the x-axis depicts time in hours. The circles represent temperature over time, whereas the triangles represent ORP over time.

Described herein is an improved process for producing compositions for plants and soils. The compositions produced by the methods and processes of the present disclosure include both liquid and solid products produced from animal manure and related waste products as a starting material. Moreover, the present disclosure provides a production process for a microbial- and nutrient-rich biostimulant/biofertilizer product that is environmentally safe and fully compatible across all precision agricultural application systems for use in the organic, conventional, and regenerative agricultural industries. In turn, the compositions produced by the processes described herein include biofertilizers and biostimulants that allow for enhanced recycling of nutrients and the regeneration of soil carbon sources as compared to chemical fertilizers.

In particular embodiments, the starting material comprises poultry manure. The process described herein includes separating a liquid fraction from an animal waste composition and subjecting that liquid fraction to an autothermal thermophilic aerobic bioreaction (ATAB) with the delivery of pure oxygen or oxygen-enriched air to the liquid stream or component. The inventors have discovered that replacement of conventional aeration or other methods that utilize atmospheric sources of oxygen with a pure or enriched-oxygen source reduces the production of foaming during the ATAB. This added benefit allows for enhanced oxygen utilization during the ATAB, thereby reducing evaporation, which in turn results in reduced thermal losses, increased operating temperature range, and higher operating temperature thereby increasing organic material decomposition that results in a liquid fertilizer product with increased stability and shelf-life that is less likely to clog or plug spray devices during field application. Additionally, the injection of pure oxygen or oxygen-enriched air into the animal waste composition during initial mixing and stabilization prior to separation prevents formation of undesired compounds formed from microbial anaerobic fermentation, including the toxic and odor-causing hydrogen sulfide, typically found in animal wastes. An exemplary animal waste suitable for use herein is avian manure and, in particular, poultry manure.

Avian manure tends to be very high in nitrogen, phosphorous, and other nutrients, as well as a robust microbial community, that plants require for growth and is therefore suitable for use in embodiments of the present invention. Shown in Table 1 is a comparison of typical nutrient and microbial content contained in manure from several different poultry species.

TABLE 1

Poultry manure nutrients analysis (source: Biol. & Agric. Eng. Dept. NC State University, January 1994; Agronomic Division, NC Dept of Agriculture & Consumer Services)

| Parameter | Unit (mean) | Chicken Layer | Chicken Broiler | Chicken Breeder | Turkey | Duck | Range |
|---|---|---|---|---|---|---|---|
| Total Solids | % wet basis | 25 | 79 | 69 | 73 | 37 | 25-79 |
| Volatile Solids | % dry basis | 74 | 80 | 43 | 73 | 66 | 43-80 |
| TKN | lb/ton | 27 | 71 | 37 | 55 | 17 | 17-71 |
| $NH_3N$ | % TKN | 25 | 17 | 21 | 22 | 22 | 17-27 |
| $P_2O_5$ | lb/ton | 21 | 69 | 58 | 63 | 21 | 21-69 |
| $K_2O$ | lb/ton | 12 | 47 | 35 | 40 | 13 | 12-47 |
| Ca | lb/ton | 41 | 43 | 83 | 38 | 22 | 22-83 |
| Mg | lb/ton | 4.3 | 8.8 | 8.2 | 7.4 | 3.3 | 3.3-14 |
| S | lb/ton | 4.3 | 12 | 7.8 | 8.5 | 3 | 3-12 |
| Na | lb/ton | 3.7 | 13 | 8.3 | 7.6 | 3 | 3-13 |
| Fe | lb/ton | 2 | 1.2 | 1.2 | 1.4 | 1.3 | 1.2-2 |
| Mn | lb/ton | 0.16 | 0.79 | 0.69 | 0.8 | 0.37 | 0.16-.8 |
| B | lb/ton | 0.055 | 0.057 | 0.034 | 0.052 | 0.021 | 0.021-0.057 |
| Mo | lb/ton | 0.0092 | 0.00086 | 0.00056 | 0.00093 | 0.0004 | 0.0004-0.0092 |
| Zn | lb/ton | 0.14 | 0.71 | 0.62 | 0.66 | 0.32 | 0.14-0.71 |
| Cu | lb/ton | 0.026 | 0.53 | 0.23 | 0.6 | 0.044 | 0.026-0.6 |
| Crude Protein | % dry basis | 32 | 26 | | 18 | | 18-32 |
| Total Bacteria | col/100 gm | 7.32E+11 | 1.06E+11 | | 5.63E+11 | | |
| Aerobic Bacteria | col/100 gm | 6.46E+10 | 1.58E+09 | | | | |

TKN, Total Kjeldahl Nitrogen (organic nitrogen, ammonia, and ammonium)

Thus, manure from domestic fowl, or poultry birds, may be especially suitable for use in the present manufacturing methods as they tend to be kept on farms and the like, making for abundant and convenient sourcing. In particular embodiments, the poultry manure is selected from chickens (including Cornish hens), turkeys, ducks, geese, and guinea fowl.

In preferred embodiments, the raw manure used in the present manufacturing process comprises chicken manure. Chicken farms and other poultry farms may raise poultry as floor-raised birds (e.g., turkeys, broilers, broiler breeder pullets) where manure is comprised of the animal feces or droppings as well as bedding, feathers and the like. Alternatively, poultry farms may raise poultry as caged egg layers that are elevated from the ground and where manure consists mainly of fecal droppings (feces and uric acid) that have dropped through the cage. In particular aspects, the chicken manure is selected from the group consisting of egg layer chickens, broiler chickens, and breeder chickens. In a more particular embodiment, the manure comprises egg layer manure.

A typical composition of chicken manure is shown in Table 2 (analysis in percentage of total composition or ppm). The moisture content can vary from 45% to 70% moisture. In addition to macro and micro nutrients, the manure contains a diverse population of microorganism which have a potential of being PGPR and also pathogenic characteristics.

The manufacturing process is designed to reduce or eliminate the pathogenic organisms and cultivate beneficial organisms, including PGPR.

TABLE 2

Raw Chicken Manure Nutrients Analysis

| Nutrient | Average | Range |
|---|---|---|
| Ammonium Nitrogen | 0.88% | 0.29-1.59% |
| Organic Nitrogen | 1.89% | 0.66-2.96% |
| TKN | 2.78% | 1.88-3.66% |
| $P_2O_5$ | 2.03% | 1.33-2.93% |
| K | 1.40% | 0.89-3.01% |
| Sulfur | 0.39% | 0.13-0.88% |
| Calcium | 3.56% | 1.98-5.95% |
| Magnesium | 0.36% | 0.22-0.60% |
| Sodium | 0.33% | 0.10-0.88% |
| Copper | 90 ppm | >20 ppm-309 ppm |
| Iron | 490 ppm | 314 ppm-911 ppm |
| Manganese | 219 ppm | 100 pm-493 ppm |
| Zinc | 288 ppm | 97 ppm-553 ppm |
| Moisture | 51.93% | 31%-71% |
| Total Solids | 49.04% | 69%-29% |
| pH | 7.60 | 5.5-8.3 |
| Total Carbon | 17.07% | 9.10%-29.20% |
| Organic Matter | 22.32% | 15%-30% |
| Ash | 19.00% | 15-25% |
| Chloride | 0.39% | 0.19%-0.80% |

In certain embodiments, the selected poultry manure comprises between about 17 lb/ton and about 71 lb/ton (i.e., between about 0.85% and about 3.55% by weight) total Kjeldahl nitrogen (TKN), which is the total amount of organic nitrogen, ammonia, and ammonium. In particular aspects, the manure comprises about 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, or 71 lb/ton TKN.

The compositions of the invention are produced from the animal waste by a process that combines physical (e.g., mechanical, thermal), chemical, and biological aspects that reduce or eliminate pathogens while promoting the growth of a diverse microbial population and generating metabolic products of those microorganisms, all of which act together to promote plant and soil health, as described in detail below. In this regard, the inventors control the time, temperature, oxidation reduction potential value, and/or pH in various stages of the process and can alter the microbial and biochemical profile of the compositions. Further, using a pure or enriched source of oxygen at various stages of the process have additional benefits that include preventing excessive foaming, improving oxygen flow to allow for more complete microbial-mediated decomposition of organic material, eliminating odor-causing contaminants, and increasing stability and shelf-life of the finished product.

While not wishing to be bound by theory, the metabolites in the compositions are believed to act as precursor building blocks for plant metabolism and can enhance regulatory function and growth. In one aspect, the bacteria in the compositions can produce allelochemicals that can include, for example, siderophores, antibiotics, and enzymes. In another aspect, precursor molecules for the synthesis of plant secondary metabolites can include flavonoids, allied phenolic and polyphenolic compounds, terpenoids, nitrogen-containing alkaloids, and sulfur-containing compounds.

All percentages referred to herein are percentages by weight (wt %) unless otherwise noted.

Ranges, if used, are used as shorthand to avoid having to list and describe each and every value within the range. Any value within the range can be selected, where appropriate, as the upper value, lower value, or the terminus of the range.

The term "about" refers to the variation in the numerical value of a measurement, e.g., temperature, weight, percentage, length, concentration, and the like, due to typical error rates of the device used to obtain that measure. In one embodiment, the term "about" means within 5% of the reported numerical value.

As used herein, the singular form of a word includes the plural, and vice versa, unless the context clearly dictates otherwise. Thus, the references "a", "an", and "the" are generally inclusive of the plurals of the respective terms. Likewise the terms "include", "including" and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The term "comprising" is intended to include embodiments encompassed by the terms "consisting essentially of" and "consisting of". Similarly, the term "consisting essentially of" is intended to include embodiments encompassed by the term "consisting of".

As used herein, "animal waste" refers to any material that contains animal manure, including litter, bedding or any other milieu in which animal manure is disposed. In one aspect, "animal waste" comprises avian or fowl manure, more particularly poultry manure (e.g., chicken, turkey, duck, goose, guinea fowl). In particular, "animal waste" comprises chicken manure, for example, from broilers or layers. In other aspects, "animal waste" can refer to waste from other animals, such as, for example, hogs, cattle, sheep, goats, or other animals not specifically recited herein. In yet another aspect, "animal waste" can refer to a mixture of waste products from two or more types of animals, for instance, two or more types of poultry.

The terms "enhanced effectiveness," "improved effectiveness," or "increased effectiveness" are used interchangeably herein to refer to enhanced ability of a biostimulant, synthetic fertilizer, chemical pesticide/herbicide, and other compounds to improve plant health, crop or seed yield, nutrient uptake or efficiency, disease resistance, soil integrity, plant response to stress (e.g., heat, drought, toxins), resistance to leaf curl, etc. For instance, an additive or supplement may be added to a biostimulant, synthetic fertilizer, or chemical pesticide/herbicide that confers "improved effectiveness" as compared to the equivalent biostimulant, synthetic fertilizer, or chemical pesticide/herbicide in the absence of that additive. In particular, the biostimulants produced by the methods disclosed herein can be admixed with a synthetic fertilizer or herbicide/pesticide to confer an improvement in plant health, crop or seed yield, nutrient uptake or efficiency, disease resistance, soil integrity, plant response to stress (e.g., heat, drought, toxins), resistance to leaf curl, etc. when compared to an equivalent plant or rhizosphere treated with the synthetic fertilizer or herbicide/pesticide in the absence of the biostimulant. The foregoing plant and soil traits can be objectively measured by the skilled artisans using any number of art-standard techniques suitable for such measurements.

"Poultry litter" refers to the bed of material on which poultry are raised in poultry rearing facilities. The litter can comprise a filler/bedding material such as sawdust or wood shavings and chips, poultry manure, spilled food, and feathers.

"Manure slurry" refers to a mixture of manure and any liquid, e.g., urine and/or water. Thus, in one aspect, a manure slurry can be formed when animal manure and urine are contacted, or when manure is mixed with water from an external source. No specific moisture and/or solids content is intended to be implied by the term slurry.

The term "autothermal thermophilic aerobic bioreaction," or "ATAB," is used herein to describe the bioreaction to which the substantially liquid component of the animal manure slurry is subjected in order to produce the liquid nutritional compositions of the present invention. As described below, the term refers to an exothermic process in which the separated liquid component of an animal waste slurry is subjected to elevated temperature (generated endogenously at least in part) for a pre-determined period of time. Organic matter is consumed by microorganisms present in the original waste material, and the heat released during the microbial activity maintains thermophilic temperatures.

In this regard, a "bioreaction" is a biological reaction, i.e., a chemical process involving organisms or biochemically active substances derived from such organisms. "Autothermal" means that the bioreaction generates its own heat. In the present disclosure, while heat may be applied from an outside source, the process itself generates heat internally. "Thermophilic" refers to the reaction favoring the survival, growth and/or activity of thermophilic microorganisms. As is known in the art, thermophilic microorganisms are "heat loving," with a growth range between 45° C. and 80° C., more particularly between 50° C. and 70° C., as described in detail herein. "Aerobic" means that the bioreaction is carried out under aerobic conditions, particularly conditions favoring aerobic microorganisms, i.e., microorganisms that prefer (facultative) or require (obligate) oxygen.

"Anaerobic" means that the conditions favor anaerobic microorganisms, i.e., microorganisms that are facultative anaerobes, aerotolerant, or are harmed by the presence of oxygen. "Anaerobic" compounds are those that are produced by microorganisms during anaerobic respiration (fermentation).

The term "pure oxygen" as used herein refers to gas that is at least about 96% oxygen and typically in the range from about 96% to about 98% oxygen.

The term "oxygen-enriched air" as used herein refers to air or gas that is at least about 30% oxygen.

The terms "ambient air" or "atmospheric oxygen" are sometimes used interchangeably herein and refer to air in its natural state as found on Earth. "Ambient air" or "atmospheric oxygen" is readily understood by the skilled artisan to mean air that is about 21% oxygen.

The term "endogenous" as used herein refers to substances or processes arising from within—for instance, from the starting material, i.e., the animal waste, or from within a component of the manufacturing process, i.e., the separated liquid component, or from within a product of the manufacturing process, i.e., a nutritional composition as described herein. A composition may contain both endogenous and exogenous (i.e., added) components. In that regard, the term "endogenously comprising" refers to a component that is endogenous to the composition, rather than having been added.

The terms "biocontrol agent" and "biopesticide" are used interchangeably herein to refer to pesticides derived from natural materials, such as animals, plants, bacteria, and certain minerals. For example, canola oil and baking soda have pesticidal applications and are considered biopesticides. "Biopesticides" include biochemical pesticides, microbial pesticides, and plant-incorporated-protectants (PIPs). "Biochemical pesticides" are naturally occurring substances that control pests by non-toxic mechanisms. "Microbial pesticides" are pesticides that contain a microorganism (e.g., bacteria, fungus, virus, or protozoan) as the active ingredient. For example, in some embodiments, *Bacillus thuringiensis* subspecies and strains are used as a "microbial pesticide." *B. thuringiensis* produces a mix of proteins that target certain species of insect larvae depending on the particular subspecies or strain used and the particular proteins produced. "PIPs" are pesticidal substances that plants produce from genetic material that has been added to the plant. For instance, in some embodiments, the gene for the *B. thuringiensis* pesticidal protein is introduced into the plant genome, which can be expressed by the plant to that protein.

As used herein, a "biostimulant" contains at least a carbon-based plant food source and may also include other substance(s) that, when applied to plants or to the rhizosphere, stimulates existing natural biological and chemical processes in the plant to enhance and/or benefit nutrient uptake, nutrient efficiency, tolerance to abiotic stress (e.g., drought, heat, and saline soils), and/or crop quality. "Biostimulants" that include one or more primary nutrients (e.g., nitrogen, phosphorus, and/or potassium) and at least one living microorganism are also biofertilizers. Other "biostimulants" may include plant growth regulators, organic acids (e.g., humic acid and fulvic acid), and amino acids/enzymes.

As used herein, the term "biofertilizer" refers to a substance which contains one or more primary nutrients (e.g., nitrogen, phosphorus, and/or potassium) and living microorganisms, which, when applied to seeds, plant surfaces, or soil, colonize the rhizosphere or the plant structure and promote growth by increasing the availability of primary nutrients to the host plant. "Biofertilizers" include, but are not limited to, plant growth promoting rhizobacteria (PGPR), compost/compost tea, and certain fungi (e.g., mycorrhizae). Examples of bacteria which have been found to enhance plant growth, include both mesophilic bacteria and thermophilic bacteria. Specific thermophilic bacteria that have been shown to enhance plant growth include members of genera such as *Bacillus, Ureibacillus, Geobacillus, Brevibacillus* and *Paenibacillus*, all known to be prevalent in poultry manure compost. Mesophiles reported to be beneficial for plant growth, include those belonging to the genera *Bacillus, Serratia, Azotobacter*, Lysinibacillus and *Pseudomonas*.

The term "mesophile" is used herein to refer to an organism that grows best at moderate temperatures typically between about 20° C. and about 45° C.

The term "organic fertilizer" typically refers to a soil amendment from natural sources that guarantee, at least the minimum percentage of nitrogen, phosphate, and potash. Examples include plant and animal byproducts, rock powder, sea weed, inoculants, and conditioners. If such fertilizers meet criteria for use in organic programs, such as the NOP, they also can be referred to as registered, approved or listed for use in such programs.

"Plant growth promoting rhizobacteria" and "PGPR" are used interchangeably herein to refer to soil bacteria that colonize the roots of plants and enhance plant growth.

"Plant growth regulator" and "PGR" are used interchangeably herein to refer to chemical messengers (i.e., hormones) for intercellular communication in plants. There are five groups of plant hormones, or PGRs, recognized currently in the art: auxins, gibberellins, cytokinins, abscisic acid, and ethylene.

The term "organic agriculture" is used herein to refer to production systems that sustain the health of soils and plants by the application of low environmental impact techniques that do not employ chemical or synthetic products that could affect both the final product, the environment, or human health.

The term "conventional agriculture" is used herein to refer to production systems which include the use of synthetic fertilizers, pesticides, herbicides, genetic modifications, and the like.

The term "regenerative agriculture" is used herein to refer to a system of farming principles and practices that increases biodiversity, enriches soil, improves watersheds, and enhances ecosystem services.

The term "rhizosphere" as used herein refers to the region or soil in the vicinity of plant roots in which the chemistry and microbiology is influenced by their growth, respiration, and nutrient exchange.

As used herein, a "soil conditioner" is a substance added to soil to improve the soil's physical, chemical or biological qualities, especially its ability to provide nutrition for plants. Soil conditioners can be used to improve poor soils, or to rebuild soils which have been damaged by improper management. Such improvement can include increasing soil organic matter, improving soil nutrient profiles, and/or increasing soil microbial diversity.

Various publications, including patents, published applications and scholarly articles, are cited throughout the specification. Each of these publications is incorporated by reference herein in its entirety.

Process:

The manufacturing process comprises the following steps: (1) preparation of the starting material (the animal waste, also referred to herein as "feedstock material"); (2) separation of the prepared feedstock material into a substantially solid and a substantially liquid component; (3) drying the substantially solid component to produce a solid nutritional composition of the invention; (4) subjecting the substantially liquid component to an autothermal thermophilic aerobic bioreaction (ATAB); and (5) subjecting the bioreaction liquid product to one or more further processing steps including filtration, pasteurization, and formulation via addition of other components. A schematic diagram depicting an exemplary embodiment of the manufacturing process applied to layer chicken manure is shown in FIG. 1 and described in Example 1. If manure is supplied as poultry litter, e.g., from broiler chickens, the bedding is removed prior to initiation of the above-summarized process.

As noted above, the manufacturing process disclosed herein may include an oxygen supply or delivery system for introducing to various steps in the process pure oxygen or oxygen-enriched air having an oxygen concentration of at least about 30%, e.g., at least about 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 95.5%, 96%, 96.5%, 97%, 97.5%, 98%, 98.5%, 99%, 99.1%, 99.2%, 99.3%, 99.4%, 99.5%, 99.6%, 99.7%, 99.8%, or 99.9%. A suitable oxygen supply system can be installed in mixing tanks, bioreactors, and the like. Such oxygen supply systems can be installed in place of typical nozzle mixers and aeration systems supplying atmospheric oxygen (or ambient air). In general, atmospheric oxygen is air or gas that has an oxygen content of about 21%, which is significantly lower than the oxygen supply provided in the present process. Pure oxygen or oxygen-enriched air can be introduced into the slurry preparation step, the ATAB step, and/or the liquid fertilizer storage tanks post-manufacturing. In addition, pure oxygen or oxygen-enriched air can be injected into the slurry during storage prior to separation if so desired.

As one skilled in the art would understand, gasses can be delivered or injected into liquids using a variety of delivery devices, such as an aspirator, venturi pump, sparger, bubbler, carbonator, pipe or tube, tank/cylinder, and the like. In particular embodiments, the gas delivery device is a sparger. A sparger suitable for use with the oxygen supply systems disclosed herein may consist of a porous construction of any art-standard plastic (such as polyethylene or polypropylene) or metal (such as stainless steel, titanium, nickel, and the like). Pressurized gas (e.g., oxygen) can be forced through the network of pores in the sparger and into an aqueous mixture, such as a slurry or liquid fraction. Pore grades suitable for use herein range from about 0.1 microns to about 5 microns, e.g., about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 microns; preferably, between about 1 and 3 microns. In a particular embodiment, the sparger pore size is from about 1.5 microns to about 2.5 microns. For instance, in one embodiment, the oxygen supply system includes 2 micron sintered stainless steel spargers.

In the preparation step, the feedstock material is first adjusted for moisture content and pH. The moisture content is adjusted by adding a liquid to form an aqueous slurry that is sufficiently liquid to be flowable from one container to another, e.g., via pumping through a hose or pipe. In certain embodiments, the aqueous slurry has a moisture content of at least about 80%. More particularly, the slurry has a moisture content of at least about 81%, or at least about 82%, or at least about 83%, or at least about 84%, or at least about 85%, or at least about 86%, or at least about 87%, or at least about 88%, or at least about 89%, or at least about 90%, or at least about 91%, or at least about 92%, or at least about 93%, or at least about 94%, or at least about 95%, or at least about 96%, or at least about 97%, or at least about 98%, or at least about 99%, with the understanding that about 99% moisture is an upper limit. In particular embodiments, the slurry has a moisture content of between about 80% to about 95%, even more particularly between about 84% and about 87%, or between about 80% and about 92%.

During preparation, the pH of the feedstock material and/or slurry is adjusted to neutral or acidic through the addition of a pH adjusting agent, it being understood that the pH can be adjusted prior to or after the adjustment of the moisture. Alternatively, the pH and moisture adjustments can occur simultaneously. Typically, the slurry will need to be acidified. In particular embodiments, the feedstock/slurry is adjusted to a pH of between about 4 and about 8, or more particularly to between about 5 and about 8, or even more particularly to between about 5.5 and about 7.5. In preferred embodiments, the pH of the slurry is between about 6.0, or about 6.1, or about 6.2, or about 6.3, or about 6.4, or about 6.5, or about 6.6, or about 6.7, or about 6.8, or about 6.9, or about 7.0, or about 7.1, or about 7.2, or about 7.3, or about 7.4, or about 7.5. In some embodiments, the slurry is adjusted to a pH of less than about 8, more preferably less than about 7.5. Acidification of an otherwise non-acidic (i.e., basic) feedstock is important to stabilize the natural ammonia in the manure into non-volatile compounds, e.g., ammonium citrate.

An acid is typically used to adjust the pH of the slurry. In certain embodiments, the acid is an organic acid, though an inorganic acid may be used or combined with an organic acid. Suitable organic acids include but are not limited to formic acid (methanoic acid), acetic acid (ethanoic acid), propionic acid (propanoic acid), butyric acid (butanoic acid), valeric acid (pentanoic acid), caproic acid (hexanoic acid), oxalic acid (ethanedioic acid), lactic acid (2-hydroxypropanoic acid), malic acid (2-hydroxybutanedioic acid), citric acid (2-hydroxypropane-1,2,3-tricarboxylic acid), and benzoic acid (benzenecarboxylic acid). Preferably, the acid is one typically used to adjust the pH of food or feed. A preferred acid is citric acid.

It may also be desired to reduce or prevent the production of anaerobic compounds produced during microbial fermentation in oxygen depleted conditions. One of these undesirable compounds is hydrogen sulfide, which can result from the anaerobic microbial breakdown of organic matter, such as manure. Hydrogen sulfide is poisonous, corrosive, and flammable with a characteristic odor of rotten eggs. Substantial reduction or elimination of the toxic and odor-causing hydrogen sulfide during the production of the liquid fertilizer product is highly desired. Odor-causing hydrogen sulfide can be oxidized by gaseous oxygen. To this end, slurry preparation may also include the delivery of oxygen to create a more aerobic environment to both prevent formation of anaerobic contaminants and to oxidize anaerobic contaminants.

In slurry or liquid components, hydrogen sulfide is dissociated into its ionic form illustrated by Equation 1:

$$H_2S \rightarrow 2H^+ + S^{-2} \quad \text{Equation 1}$$

The sulfide ion is then free to react with oxygen according to Equation 2:

$$2H_2S + O_2 \rightarrow 2H_2O + 2S \quad \text{Equation 2}$$

The reaction ratio of hydrogen sulfide oxidation is around 1.0. For instance, 1 mg/kg (ppm) of oxygen is required for each ppm of hydrogen sulfide. In some embodiments, the residual dissolved oxygen in the slurry or liquid component is at least about 0.5 ppm, e.g., 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, or more ppm. In a preferred embodiment, the residual dissolved oxygen level in the slurry or liquid component is at least about 1 ppm, more preferably at least about 2 ppm. However, typical slurry mixing tanks supply atmospheric oxygen to the system to reduce the production of compounds formed by the microorganisms' anaerobic metabolism. Atmospheric oxygen sources may provide insufficient oxygen for the elimination of hydrogen sulfide contaminant. Thus, a more efficient oxygen delivery system is desired.

Therefore, to oxidize hydrogen sulfide and other contaminants in the mixing tank during slurry preparation, the preparation step may include an oxygen supply or delivery system for injecting pure or oxygen-enriched air into the slurry, which provides a substantial increase in oxygen delivery as compared to existing aeration systems delivering atmospheric oxygen. The oxygen supply or delivery system may include any suitable means for delivering or injected the oxygen into the slurry, such as one or more spargers, venturi pumps, bubblers, carbonators, pipes, etc. In a particular embodiment, the oxygen supply or delivery system includes a plurality of spargers. In some embodiments, the oxygen is delivered to the mixing tank of the preparation step and/or directly injected into the slurry at a rate of about 0.1 CFM to about 3 CFM per 10,000 gallons of material, e.g., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 CFM. In a preferred embodiment, the delivery rate is between about 0.25 CFM and about 1.5 CFM per 10,000 gallons of material. For instance, in one particular embodiment, the oxygen is delivered to the mixing tank of the preparation step and/or directly injected into the slurry at a rate of about 0.5 CFM per 10,000 gallons of material. Thus, the oxygen supply or delivery system disclosed herein increases the residual dissolved oxygen content to meet the desired threshold described above.

The slurry preparation system is designed to prepare a homogeneous slurry in an aqueous medium at a pH of 4 to 8, preferably 5 to 8 and at an elevated temperature. The temperature is elevated at this stage for several purposes, including (1) to promote mixing and flowability of the slurry, (2) to kill pathogens and/or weed seeds, and/or (3) to facilitate growth of thermophilic and/or mesophilic bacteria present in the feedstock. The temperature can be elevated by any means known in the art, including but not limited to conductive heating of the mixing tank, use of hot water to adjust moisture content, or injection of steam, to name a few. In certain embodiments, the slurry is heated to at least about 60° C., or at least about 61° C., or at least about 62° C., or at least about 63° C., or at least about 64° C., or at least about 65° C., or at least about 66° C., or at least about 67° C., or at least about 68° C., or at least about 69° C., or at least about 70° C. Typically, the temperature does not exceed about 80° C., or more particularly it is less than about 75° C., or less than about 70° C. In certain embodiments, the temperature of the slurry is maintained at between about 65° C. and about 75° C.

The pH-adjusted aqueous slurry is maintained at the elevated temperature for a time sufficient to break the manure down into fine particles, fully homogenizing the slurry for further processing, killing pathogens and weed seeds, and/or activating the native thermophilic (and/or mesophilic) bacteria. In certain embodiments, the slurry is held at the elevated temperature for at least about one hour and up to about 4 hours, e.g., about 1, 1.5, 2, 2.5, 3, 3.5, or 4 hours. Typically, the slurry is subjected to chopping, mixing, and/or homogenization during this phase. In certain embodiments, the preparation step as outlined above is segregated from subsequent steps of the process to reduce the likelihood that downstream process steps could be contaminated with raw manure.

In an exemplary embodiment, the slurry system consists of a tank (e.g., a steel tank or stainless steel tank), equipped with a chopper/homogenizer (e.g., a macerator or chopper pump), an oxygen supply system, pH and temperature controls and a biofiltration system for off-gases.

An exemplary process consists of charging the tank with water, heating it to 65° C. or higher, lowering the pH to 8 or lower, preferably to a range of 5-8, with citric acid. The chopper pump, oxygen supply system (e.g., via spargers), and off gas biofiltration systems are turned on before introducing the feedstock to ensure a moisture content of, e.g., 85 to 90%. It is a batch operation and, in various aspects, can take one to four hours to make a homogeneous slurry. The operation ensures that each particle of the manure is subjected to temperatures of 65° C. or higher for a period of at least one hour to kill substantially all the pathogens and weeds. Further, the injection of pure oxygen or oxygen enriched air reduces or eliminates toxic and odor-causing contaminants, such as hydrogen sulfide, produced by anaerobic fermentation.

In certain embodiments, the animal waste slurry prepared as described above is transferred from a slurry tank by pumping, e.g., using a progressive cavity pump. Progressive cavity pumps are particularly suitable devices for moving slurries that can contain extraneous materials such as stones, feathers, wood chips, and the like. The transfer line can be directed into a vibratory screen where the screens can be either vibrating in a vertical axial mode or in a horizontal cross mode. The selected vibratory screen will have appropriate sized holes to ensure that larger materials are excluded from the slurry stream. In one embodiment, the screens exclude materials larger than about ⅛ inch in any dimension.

In some embodiments, the slurry stream is directed into storage tanks, which may be equipped with pH and temperature controls and/or an agitation system. In particular embodiments, the storage tanks may also be equipped with an oxygen supply system. In such embodiments, the slurry is kept under aerobic conditions by injecting pure oxygen or oxygen-enriched air at a rate of from about 0.1 CFM to about 3 CFM per 10,000 gallons of slurry, e.g., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 CFM per 10,000 gallons of slurry. Preferably, the pure oxygen or oxygen-enriched air is delivered to the slurry at about 0.25 CFM to about 1.5 CFM per 10,000 gallons of slurry, more preferably at about 0.5 CFM per 10,000 gallons of slurry. In some embodiments, the oxygen is delivered via a plurality of spargers such as those described above. By keeping the slurry under aerobic conditions, the formation of anaerobic compounds is avoided. Optionally, the off-gases are subjected to biofiltration or other means of disposal. The slurry stream leaving the storage tank is sent to a separation system (e.g., a centrifuge or belt filter press) for the next step of the process.

In the separation step, the slurry stream from the storage tank is pumped into a solid-liquid separation system, which can include, but is not limited to, mechanical screening or clarification. The purpose of this step is to reduce solids, such as cellulosic and hemicellulosic material that are unsuitable for the subsequent ATAB. It is noteworthy that a substantial fraction of phosphorus and calcium present in the feedstock tends to separate with the solids in this step. Suitable separation systems include centrifugation, fractional distillation, filtration (e.g., via a filter press), vibratory separator, sedimentation (e.g., gravity sedimentation), and the like. In some embodiments, a two-step separation system may be used, e.g., a centrifugation step followed by a vibratory screen separation step.

In a non-limiting exemplary embodiment, the method employs a decanter centrifuge that provides a continuous mechanical separation. The operating principle of a decanter centrifuge is based on gravitational separation. A decanter centrifuge increases the rate of settling through the use of continuous rotation, producing a gravitational force between 1000 to 4000 times that of a normal gravitational force. When subjected to such forces, the denser solid particles are pressed outwards against the rotating bowl wall, while the less dense liquid phase forms a concentric inner layer. Different dam plates are used to vary the depth of the liquid as required. The sediment formed by the solid particles is continuously removed by the screw conveyor, which rotates at different speed than the bowl. As a result, the solids are gradually "ploughed" out of the pond and up the conical "beach". The centrifugal force compacts the solids and expels the surplus liquid. The compacted solids then discharge from the bowl. The clarified liquid phase or phases overflow the dam plates situated at the opposite end of the bowl. Baffles within the centrifuge casing direct the separated phases into the correct flow path and prevent any risk of cross-contamination. The speed of the screw conveyor can be automatically adjusted by use of the variable frequency drive (VFD) in order to adjust to variation in the solids load. In some embodiments, polymers may be added to the separation step to enhance separation efficiency and to produce a drier solids product. Suitable polymers include polyacrylamides, such as anionic, cationic, nonionic, and Zwitterion polyacrylamides.

Thus, the separation process results in formation of a substantially solid component and a substantially liquid component of the prepared animal waste slurry. The term "substantially solid" will be understood by the skilled artisan to mean a solid that has an amount of liquid in it. In particular embodiments, the substantially solid component may contain, e.g., from about 40% to about 64% moisture, often between about 48% and about 58% moisture, and is sometimes referred to herein as "solid," "cake," or "wet cake." Likewise, the term "substantially liquid" will be understood to mean a liquid that has an amount or quantity of solids in it. In particular embodiments, the substantially liquid component may contain between about 2% and about 15% solids (i.e., between about 85% and about 98% moisture), often between about 4% and about 7% solids, and is sometimes referred to herein as "liquid," "liquid component," or "centrate" (the latter if the separation utilizes centrifugation). Approximately 30% of the raw feedstock is retained in the substantially liquid component, with about 70% being retained in the cake.

The solids from the separation step are dried to a moisture content suitable for subsequent handling and packaging of the material. In some embodiments, the solids from the separation step are dried at a temperature of less than about 220° C. for about 5 to 15 minutes, e.g., 5, 6, 7, 8, 9, 10, 11, 12, 13, 14, or 15 minutes, and at a rate of about 900 kg to about 2,700 kg (wet basis) of solids per hour. Preferably, the maximum drying temperature is 200° C. to about 220° C. at a rate of about 1,500 to about 2,000 kg of solids per hour. In other embodiments, the solids are dried at a temperature of between about 80° C. and about 230° C., e.g., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C., 225° C., or 230° C. Suitable drying equipment are known to the skilled artisan and include, for example, fluid bed dryers, vacuum dryers, flash dryers, and rotary dryers. For instance, in one particular embodiment, a fluid bed dryer may be used to dry the solid component obtained from the separation step. In certain embodiments, the solid component is dried to less than about 20% moisture. In particular embodiments, the solids are dried to less than about 19%, or less than about 18%, or less than about 17%, or less than about 16%, or less than about 15%, or less than about 14%, or less than about 13%, or less than about 12%, or less than about 11%, or less than about 10% moisture. In a preferred embodiment, the solid component is dried to less than 12% moisture. For instance, a solid component having a moisture content of about 30% to about 55% can be subjected to the drying step for about 3-5 minutes to reduce the moisture content to about 10%. The dried solid is sometimes referred to herein as "dried cake." The dried solid may be used as a biostimulant to enhance the microbiome contributing to enhanced plant growth, resistance to stress, nutrient uptake and efficiency, and the like.

In certain embodiments, the manufacturing process includes a granulation step whereby the solid material is made into a product suitable for use in agricultural or landscape application spreaders. In such embodiments, the solid component from the separation step is fed into a combination cage mill/flash dryer and dried at a temperature in the range from about 65° C. to about 220° C.; preferably between about 200° C. and about 220° C. The solids are reduced to a consistent fineness of less than about 0.5 mm, e.g., about 0.5 mm, 0.4 mm, 0.3 mm, 0.2 mm, 0.15 mm, 0.1 mm, 0.05 mm, or less, and a moisture content of less than or equal to about 25% moisture. Preferably, the solids are reduced to a consistent fineness of less than about 0.2 mm with a moisture content of equal to or less than about 20% moisture. For instance, in one particular embodiment, the solids are fed into a combination cage mill/flash dryer to produce a material having a fineness of less than about 0.177 mm (about 80 mesh). The dried solids are then sent to a pin mixer and mixed with a suitable binding agent (e.g., molasses). In some embodiments, the solids/binding agent mixture is pelletized to a pellet size suitable for agricultural application spreaders, which is about 1 mm to about 6 mm, e.g., 1 mm, 2 mm, 3 mm, 4 mm, 5 mm, or 6 mm. Preferably, the pellet size for agricultural application spreaders is about 2 mm to about 4 mm (about 5-10 mesh). In other embodiments, the solids/binding agent mixture is pelletized to a pellet size suitable for landscape application spreaders (i.e., greens grade), which is about 0.1 mm to about 2 mm, e.g., 0.1 mm, 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, or 2 mm. Preferably, the greens grade pellet size for landscape application spreaders is about 0.6 mm to about 1.6 mm (about 12-30 mesh). The pellets are sent to another dryer for final drying where the pellets are dried to less than about 15% moisture, e.g., 15%, 14%, 13%, 12%, 11%, 10%, or less moisture; preferably, the pellets have a moisture content of equal to or less than about 12% moisture at this stage. The dried pellets are then cooled and screened for size.

In certain embodiments, the manufacturing process is a closed-loop system in which off-gases and water vapors from any or all stages of the system, including the dryer, are captured and condensed into a nutrient-rich liquid form. This liquid can be re-integrated into the liquid manufacturing processes described below, e.g., into the feedstock slurry, the bioreactor or into the base product exiting the bioreactor.

The next step involves subjecting the substantially liquid component to an autothermal thermophilic aerobic bioreaction (ATAB). ATAB is an exothermic process in which the separated liquid component with finely suspended solids is subjected to elevated temperature for a pre-determined period of time. Organic matter is consumed by microorganisms present in the original waste material, and the heat released during the microbial activity maintains mesophilic and/or thermophilic temperatures thereby favoring the production of mesophilic and thermophilic microorganisms, respectively. Autothermal thermophilic aerobic bioreaction produces a biologically stable product which contains macro and micro nutrients and PGPR.

In certain embodiments, the elevated temperature conditions are between about 45° C. and about 80° C. More particularly, the elevated temperature conditions are at least about 46° C., or 47° C., or 48° C., or 49° C., or 50° C., or 51° C., or 52° C., or 53° C., or 54° C., or 55° C., or 56° C., or 57° C., or 58° C., or 59° C., or 60° C., or 61° C., or 62° C., or 63° C., or 64° C., or 65° C., or 66° C., or 67° C., or 68° C., or 69° C., or 70° C., or 71° C., or 72° C., or 73° C., or 74° C., or 75° C., or 76° C., or 77° C., or 78° C., or 79° C. In particular embodiments, the elevated temperature conditions are between about 45° C. and about 75° C., more particularly between about 45° C. and about 70° C., more particularly between about 50° C. and about 70° C., more particularly between about 50° C. and about 65° C., and most particularly between about 55° C. and about 60° C.

In general, the temperature of the ATAB gradually increases to the mesophilic phase and then to the thermophilic phase. It being understood by one having ordinary skill in the art that the mesophilic phase is at a temperature range in which mesophiles grow best (e.g., about 20° C. to about 45° C.). As the temperature increases above 20° C. to about 40° C., the liquid component enters a mesophilic phase thereby enriching for mesophiles. In some embodiments, the mesophilic phase temperature is between about 30° C. and about 40° C., e.g., about 30° C., 31° C., 32° C., 33° C., 34° C., 35° C., 36° C., 37° C., 38° C., 39° C., or 40° C. In other embodiments, the mesophilic phase temperature is about 35° C. to about 38° C. In such embodiments, the liquid component is maintained at mesophilic phase temperatures for a period of 1 hour to several days, e.g., at least about 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 1 day, 2 days, 3 days, 4 days, or 5 days. In preferred embodiments, the liquid component is maintained at mesophilic phase temperatures for a period of about 1 to 4 days; more preferably, about 1 to 3 days. For instance, in one particular embodiment, the liquid component is maintained at mesophilic phase temperatures for about 3 days. As the temperature continues to increase, the liquid component enters a thermophilic phase thereby enriching for thermophiles. It being understood by one having ordinary skill in the art that the thermophilic phase is at a temperature range in which thermophiles grow best (e.g., about 40° C. to about 80° C.). In some embodiments, the thermophilic phase temperature is between about 45° C. and about 80° C., e.g., about 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., or 80° C. In other embodiments, the thermophilic phase temperature is about 50° C. to about 70° C.

In certain embodiments, the liquid component is maintained at the elevated temperature for a period of several hours to several days. A range of between 1 day and 18 days is often used. In certain embodiments, the conditions can be maintained for 1, 2, 3, 4, 5, 6, 7, 8, 9, or more days. For purposes of guidance only, the bioreaction is maintained at the elevated temperature for a longer period, e.g., three or more days, to ensure suitable reduction of pathogenic organisms, for instance to meet guidelines for use on food portions of crops. However, inasmuch as the length of the bioreaction affects the biological and biochemical content of the bioreacted product, other times may be selected, e.g., several hours to one day or two days. In particular embodiments, after being maintained at the elevated temperature suitable for thermophilic bacteria, the temperature of the liquid component gradually decreases into the mesophilic temperature range where it is maintained at mesophilic phase temperatures until the liquid component is flash pasteurized as described below or run through a heat exchanger to rapidly drop the temperature, either of which, in many cases, causes the bacteria to produce spores.

One challenge in operating under aerobic thermophilic conditions is to keep the process sufficiently aerobic by meeting or exceeding the oxygen demand while operating at the elevated temperature conditions. One reason this is challenging is that as the process temperature increases, the saturation value of the residual dissolved oxygen decreases. Another challenge is that the activity of the thermophilic microorganisms increases within increasing temperature, resulting in increased oxygen consumption by the microorganisms. Because of these factors, greater amounts of oxygen, in various aspects, should be imparted into the biomass-containing solutions.

As described in WO 2017/112605 A1, the content of which is incorporated herein in its entirety, existing bioreactors use aeration devices, such as jet aerators, to deliver atmospheric oxygen to the bioreactor due to high oxygen transfer efficiency, the capability for independent control of oxygen transfer, superior mixing, and reduced off-gas production. However, it was discovered by the inventors that atmospheric oxygen caused excess foaming inside the bioreactor and impeded the efficiency of the oxygen supply and caused frequent shut down of the air supply. In some instances, for example, the level of foaming exceeded several feet, e.g., 1, 2, 3, 4, 5, 6, 7, 8 feet or more. In turn, the inadequate air supply and reaction disruption resulted in incomplete decomposition of undesirable organic material. What is more, an increase in undecomposed solids suspended in the substantially liquid stream proved difficult to remove and frequently resulted in liquid fertilizer that plugged spray equipment during field application thereby halting field operations. Moreover, undecomposed solids that are present in the final liquid fertilizer product decreased stability and shelf-life.

Thus, to overcome these obstacles, in a particular embodiment pure oxygen or oxygen-enriched air is delivered to the bioreactor and injected or otherwise delivered into the substantially liquid component at a rate of from about 0.1 CFM to about 5 CFM per 1,000 gallons of liquid component, e.g., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 CFM per 1,000 gallons of liquid component. In preferred embodiments, the pure oxygen or oxygen-enriched air is delivered to the bioreactor and injected or otherwise delivered into the substantially liquid component at a rate of from about 0.5 CFM to about 1.5 CFM per 1,000 gallons of liquid component, more preferably the rate is about 1.0 CFM per 1,000 gallons of liquid component.

In particular embodiments, pure oxygen or oxygen-enriched air is delivered to the bioreactor by using a plurality of spargers as described above. For instance, one or more 2 micron sintered stainless steel spargers may be used to inject pure oxygen or oxygen-enriched air into the substantially liquid component during ATAB. Keeping the substantially liquid components under aerobic conditions will cultivate and enrich for aerobic, mesophilic and thermophilic bacteria. In particular embodiments, the initial decomposition of the organic material in the liquid component is carried out by mesophilic organisms, which rapidly break down the soluble and readily degradable compounds. The heat the mesophilic organisms produce causes the temperature during ATAB to increase rapidly thereby enriching for thermophilic organisms that accelerate the breakdown of proteins, fats, and complex carbohydrates (e.g., cellulose and hemicellulose). As the supply of these high-energy compounds become exhausted, the temperature of the liquid component gradually decreases, which promotes mesophilic organisms once again resulting in the final phase of "curing" or maturation of the remaining organic matter in the liquid component. Thus, the replacement of atmospheric oxygen supply with a pure oxygen or oxygen-enriched supply substantially reduced the amount of foam produced in the bioreactor during ATAB. The reduction in foam, in turn, allowed for more efficient air supply, more consistent bioreactor operation, and a more robust aerobic environment thereby resulting in a substantial reduction in undecomposed organic material and a more stable and cost-efficient final product.

The ATAB conditions described herein allow for the growth and enrichment of several thermophilic and mesophilic microorganisms for use as PGPR. Beneficial thermophilic and mesophilic microorganisms that can be isolated from the substantially liquid component include, but are not limited to, *Bacillus* sp. (e.g., *B. isronensis* strain B3W22, *B. kokeshiiformis*, *B. licheniformis*, *B. licheniformis* strain DSM 13, *B. paralicheniformis*, *B. paralicheniformis* strain KJ-16), *Corynebacterium* sp. (e.g., *C. efficiens* strain YS-314), *Idiomarina* sp. (e.g., *I. indica* strain SW104), *Oceanobacillus* sp. (e.g., *O. caeni* strain S-11), *Solibacillus* sp. (e.g., *S. silvestris* strain HR3-23), *Sporosarcina* sp. (e.g., *S. koreensis* strain F73, *S. luteola* strain NBRC 105378, *S. newyorkensis* strain 6062, *S. thermotolerans* strain CCUG 53480) and *Ureibacillus* sp. (e.g., *U. thermosphaericus*).

In some embodiments, the pure oxygen or enriched oxygen supply disclosed herein reduces the production of foam in the bioreactor during ATAB by at least about 25% as compared to a bioreactor utilizing an atmospheric oxygen supply during ATAB. In other embodiments, the production of foam is reduced by at least about 50%. In more preferred embodiments, the production of foam is reduced to by at least about 75% or more, e.g., about 75%, 76%, 77%, 78%, 79%, 80%, 81%, 82%, 83%, 84%, 85%, 86%, 87%, 88%, 89%, 90%, 91%, 92%, 93%, 94%, 95%, or more. In some embodiments, the level of foaming in the bioreactor is less than about 2 feet. In a more preferred embodiment, the level of foaming in the bioreactor is less than about 1 foot, e.g., 12 in., 11 in., 10 in., 9 in., 8 in., 7 in., 6 in., 5 in., 4 in., 3 in., 2 in., 1 in., 0.5 in., or less. For instance, in an exemplary embodiment, the level of foam is about 6 inches.

In one aspect, a well configured oxygen supply system should maintain dissolved oxygen levels of between about 1 mg/L and about 8 mg/L, e.g., about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1., 7.2, 7.3, 7.4, 7.5, 7.6, 7.7, 7.8, 7.9. or 8.0 mg/L. In a preferred embodiment, the oxygen supply system should maintain dissolved oxygen levels of between about 2 mg/L and about 6 mg/L; more preferably, between about 3 mg/L and about 4 mg/L. In certain embodiments, oxygenation of the bioreaction is measured in terms of oxidation-reduction potential (ORP). Typically, the ORP of the bioreaction is maintained between about −580 mV to about +10 mV. More particularly, it is maintained within a range of between −250 mV and −50 mV.

To monitor the temperature, pH and oxygenation parameters of the ATAB, the bioreactor can be equipped with automated controllers to control such parameters. In some embodiments, the bioreactor is equipped with a programmable logic controller (PLC) that effectively controls pH, ORP, and other parameters by adjusting oxygen air supply and feed rate of a pH adjuster to the bio-reactor. In fact, the delivery of oxygen to any of the process steps disclosed herein can be controlled using a PLC in this manner.

The off-gases from the slurry preparation tank and slurry storage tank contain carbon dioxide, air, ammonia, and water vapors; whereas the off-gases from the bio-reactor contain oxygen depleted air, carbon dioxide and water vapors. In certain embodiments, these off-gases are directed to a biofilter. When applied to air filtration and purification, biofilters use microorganisms to remove undesired elements. The off gases flow through a packed bed and the pollutant transfers into a thin biofilm on the surface of the packing material. Microorganisms, including bacteria and fungi are immobilized in the biofilm and degrade the pollutant.

The product stream from the bioreactor is directed into a receiving container and can be used as a final product at that stage or subjected to further processing. This composition is sometimes referred to herein as "base composition" or "base product." In certain embodiments, the receiving vessel for the base composition is equipped with an agitation system that maintains the colloidal components of the liquid stream in the homogeneous suspension.

The initial heat step and the heat and other conditions applied in the ATAB are effective to substantially or completely eliminate human pathogenic organisms, as well as weeds and seeds, leaving beneficial aerobic thermophiles and mesophiles. However, in certain embodiments, the base composition is subjected to a second heat treatment for the purpose of further reducing the microbial load so that the composition can be supplemented with exogenous microorganisms as desired, e.g., in a customized product. This step, referred to herein as "pasteurization" or "flash pasteurization," depending on the time and temperature of treatment, comprises heating the liquid composition to between about 65° C. and about 100° C. for between about 5 minutes and about 60 minutes. In certain embodiments, the base composition is heated to at least 70° C., or at least 75° C., or at least 80° C., or at least 85° C., or at least 90° C., or at least 95° C. In certain embodiments, the base composition is heated for at least 10 minutes, or at least 15 minutes, or at least 20 minutes or at least 25 minutes, or at least 30 minutes, or at least 35 minutes, or at least 40 minutes, or at least 45 minutes, or at least 50 minutes, or at least 55 minutes, noting that the heating time typically is inversely proportional to the heating temperature. In certain embodiments, the composition is heated to about 95° C. for about 30 to 45 minutes.

The liquid composition can also be subjected to one or more filtration steps to remove suspended solids. The solids retained by such filtration processes can be returned to the manufacturing process system, e.g., to the aerobic bioreactor.

Filtration can involve various filter sizes. In certain embodiments, the filter size is 100 mesh (149 microns) or smaller. More particularly, the filter size is 120 mesh (125 microns) or smaller, or 140 mesh (105 microns) or smaller, or 170 mesh (88 microns) or smaller, or 200 mesh (74 microns) or smaller, or 230 mesh (63 microns) or smaller, or 270 mesh (53 microns) or smaller, or 325 mesh (44 microns) or smaller, or 400 mesh (37 microns) or smaller. In particular embodiments, the filter size is 170 mesh (88 microns), or 200 mesh (74 microns), or 230 mesh (63 microns), or 270 mesh (53 microns). In certain embodiments, a combination of filtration steps can be used, e.g., 170 mesh, followed by 200 mesh, or 200 mesh followed by 270 mesh filtrations. Filtration is typically carried out using a vibratory screen, e.g., a stainless mesh screen, drum screen, disc centrifuge, pressure filter vessel, belt press, or a combination thereof. Filtration typically is carried out on products cooled to ambient air temperature, i.e., below about 28° C.-30° C.

The base product can also be further formulated to produce products, sometimes referred to herein as "formulated products," "formulated compositions," and the like, for particular uses. In certain embodiments, additives include macronutrients, such as nitrogen and potassium. Products formulated by the addition of macronutrients such as nitrogen and potassium are sometimes referred to as "formulated to grade," as would be appreciated by the person skilled in the art. In exemplary embodiments comprising a liquid nutritional composition prepared from chicken manure, the base composition is formulated to contain about 1.5% to about 3% nitrogen and about 1% potassium to produce a biofertilizer product suitable for use in the either the organic or the conventional agriculture industry. For conventional agriculture use only, an exemplary embodiment may comprise a base composition formulated to contain about 7% nitrogen, about 22% phosphorus, and about 5% zinc for use as a starter fertilizer to optimize plant growth and development.

In other embodiments, additives include one or more micronutrients as needed or desired. Though the base composition already contains a wide range of micronutrients and other beneficial substances as described in detail below, it is sometimes beneficial to formulate the composition with such additives. Suitable additives for both organic and conventional agriculture include, but are not limited to, blood meal, seed meal (e.g., soy isolate), bone meal, feather meal, humic substances (humic acid, fulvic acid, humin), microbial inoculants, sugars, micronized rock phosphate and magnesium sulfate, to name a few. For conventional agriculture only, suitable additives may also include, but are not limited to, urea, ammonium nitrate, UAN-urea and ammonium nitrate, ammonium polyphosphate, ammonium sulfate, and microbial inoculants. Other materials that are suitable to add to the base product will be apparent to the person of skill in the art.

In some embodiments, the materials added to the base composition are approved for use in conventional farming only. In other embodiments, the materials added to the base composition are themselves approved for use in an organic farming program, such as the USDA NOP, and can thus be used in conventional, organic, or regenerative farming programs. In particular embodiments, nitrogen is added in the form of sodium nitrate, particularly Chilean sodium nitrate approved for use in organic farming programs. In other embodiments, potassium is added as potassium sulfate. In yet other embodiments, potassium is added as potassium chloride, potassium magnesium sulfate, and/or potassium nitrate.

The base composition can be formulated any time after it exits the bioreactor and before it is finished for packaging. In one embodiment, the product is formulated with macronutrients prior to any subsequent processing steps. In this embodiment, the product stream is directed into a formulation product receiving vessel where the macronutrients are added. Other materials can be added at this time, as desired. The formulated product receiver can be equipped with an agitation system to ensure that the formulation maintains the appropriate homogeneity.

It will be apparent to the skilled person that the above-described subsequent processing steps, i.e., pasteurization, filtration and formulation, may be performed either singly or in combination, and in any order. Thus, for instance, one embodiment comprises formulation to grade, pasteurization, two levels of filtration and a secondary formulation step. Another embodiment comprises no pasteurization and one or two levels of filtration. Other combinations are also suitable, depending on the desired properties of the finished composition.

Prior to packaging and/or storage, it can be beneficial to adjust the final pH of the liquid composition to enhance stability. Thus, in certain embodiments, the final products can be adjusted to a pH between about 4 and about 8, or between about 4.5 and about 8, or between about 5 and about 8, or between about 5.5 and about 7.5, or between about 6 and about 7.5, or between about 5.5 and about 7.0, or between about 6.5 and about 7.0 using a suitable pH adjusting agent as described above. In particular embodiments, the pH adjusting agent is an organic acid, such as citric acid.

In specific embodiments, post-ATAB processing includes one or more of the following steps. For organic farming, the base composition may be formulated to grade either as 1.5-0-3 or 3-0-3 (N-P-K) by adding sodium nitrate and potassium sulfate. Alternatively, for conventional farming, the base composition may be formulated to grade as 0-0-6-2S (N-P-K) by adding potassium sulfate. The pH of the composition is next adjusted to 5.5 with citric acid and then flushed through a vibratory screener at about 40 gallons per minute. The vibratory screener is fitted with a 200 mesh stainless steel screen. The filtered product is then pumped through a cartridge filter. Typical operating parameters of the cartridge filter include one or more of the following: (1) differential pressure up to 40 PSI; (2) inlet temperature 29.5° C. (85° F.) or less; and (3) vessel housing pressure up to 40 PSI. In some embodiments, the composition is subjected to one filtration step. In other embodiments, more than one filtration step is included in the process.

In some embodiments, the liquid composition or formulated product is directed into storage tanks, which may be equipped with pH and temperature controls and/or an agitation system. In particular embodiments, the storage tanks may also be equipped with an oxygen supply system. In such embodiments, the post ATAB liquid product is kept under aerobic conditions by injecting pure oxygen or oxygen enriched air at a rate of from about 0.1 CFM to about 3 CFM per 10,000 gallons of liquid, e.g., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 CFM per 10,000 gallons of liquid. Preferably, the pure oxygen or oxygen-enriched air is delivered to the post ATAB liquid product at about 0.25 CFM to about 1.5 CFM per 10,000 gallons of liquid, more preferably at about 0.5 CFM per 10,000 gallons of liquid. In some embodiments, the oxygen is delivered via a plurality of spargers such as those described above. By keeping the post ATAB liquid product (i.e., the liquid composition or formulated product) under aerobic conditions, the formation of anaerobic compounds is avoided.

Packaging of the finished product can include dispensing the product into containers from which the material can be poured. In certain embodiments, filled containers may be sealed with a membrane cap ("vent cap," e.g. from W.L. Gore, Elkton, MD) to permit air circulation in the headspace of the containers. These membranes can be hydrophobic and have pores small enough that material cannot leak even in the event the containers are completely inverted. Additionally, the pores can be suitably small (e.g., 0.2 micron) to eliminate the risk of microbial contamination of the container contents.

The following examples are provided to describe the invention in greater detail. They are intended to illustrate, not to limit, the invention.

Example 1. Process for Producing Fertilizer/Nutritional Composition from Chicken Manure Depicted in FIG. 1 is an embodiment of the production process described herein for producing liquid and solid compositions from chicken manure. The production process depicted in FIG. 1 produced pathogen-free products that retained the primary and secondary nutrients, as well as micro-nutrients, present in layer manure. In addition, the process described herein removed potentially problematic phosphorus and hydrogen sulfide from the products.

As shown in FIG. 1, the process began 10 when raw chicken manure was transported to the location directly from the farm(s) in covered live bottom trailers. The trucks were unloaded into mix tanks at the location and combined with citric acid 15 and water to form a homogeneous slurry. The citric acid bound the natural organic ammonia in raw manure.

The next step in the process involved the preparation of feedstock material 20. In this step, the stored slurry was mixed with water 25 adequate to elevate the moisture level of the slurry to a moisture range from about 84% to about 87% moisture. The mixing tank was fitted with 2 micron sintered stainless steel spargers for delivering pure oxygen. During mixing, pure oxygen 22 (>96%) was injected into the slurry at a rate of 0.5 CFM per 10,000 gallons of slurry. The slurry was then heated with steam 30 to 65° C. for a minimum of 1 hour to break down the manure into fine particles and was fully homogenized into a slurry for further processing. Additionally, the step included both the killing of any pathogens potentially harmful to humans and/or plants that were found in raw manure as well as the activation of native mesophilic and thermophilic bacteria. In particular embodiments, this part of the manufacturing process was segregated from the rest of the system to reduce the risk that processed fertilizer material would be contaminated by raw manure. The mixing tank process parameters for the preparation of feedstock material 20 are shown in Table 3.

TABLE 3

Mixing Tank Process Parameters.

| Process Parameter | Range of Operational Parameters | Notes |
| --- | --- | --- |
| Mixing Tank | 3,000 to 4,000 gallons | Tank Size 5,000 gallons |
| Axial Turbine Mixer | 45 to 60 HZ | 75 to 100% Spins clockwise, forces material down turns tank over 1 to 3 times per minute |

TABLE 3-continued

Mixing Tank Process Parameters.

| Process Parameter | Range of Operational Parameters | Notes |
|---|---|---|
| Macerator | 45 to 60 HZ | 75 to 100% Reduces particle size, homogenizes mix |
| Pump | 45 to 60 HZ | 75 to 100% Pump Size 3 HP, Positive Displacement |
| Mixing Tank pH | 6.5 to 7.0 | Citric acid addition varies from patch to patch typically 1 to 2% by weight addition |
| Mixing Tank Temperature | 65° C. to 75° C. 60 minutes | Measured by thermowell via tank penetration |
| Moisture % | 84 to 87% | Measured by loss of drying |
| Viscosity | 2000 to 3000 CPS | |
| Heating Method | Direct Steam Injection 3 to 8 PSI | Direct steam injection to heat the material |
| Oxygenation Method | Direct Pure Oxygen Injection at 0.5 CFM per 10,000 gallons | Oxygen delivery via 2 micron sintered stainless steel spargers |

HZ, hertz; HP, horsepower; CPS, centipoise; PSI, pounds per square inch; CFM, cubic feet per minute The slurry was then sent to the centrifuge 35, whereas debris, oyster shells, and other grit from chicken feed were removed 40. In preferred embodiments, centrifuge 35 is a decanting centrifuge. Suitable centrifuge parameters for the separation of the solid and liquid fractions are shown in Table 4. The centrifuge 35 separated the slurry into two streams—a liquid stream and a solid stream. The solid stream 43 was dried to about 12% (or less) moisture and used to produce a dry fertilizer product ("dry formulation"). The liquid stream 45 was sent to the aerobic bioreactor 50. In another embodiment, the slurry was first sent to the centrifuge 35 and then to a vibratory separator (SWECO, Florence, KY, USA) in a two-step separation process.

TABLE 4

Centrifuge parameters

| Process Parameter | Range of Operational Parameters | Notes |
|---|---|---|
| Decanting Centrifuge | 3250 RPM Max | |
| Influent volume | 25-30 gallons per minute | Slurry from mixer being pumped into centrifuge |
| Effluent volume | 25% of input manure by weight is extracted as finely suspended solids | Liquid fraction exiting the centrifuge |
| Solids separation | 75% of input manure by weight | Solids fraction discharge |
| Differential | 7 to 12% | |
| Bowl Speed | 2900 to 3250 RPM | |
| Torque Scroll | 10% or less | |

RPM, revolutions per minute

Once the liquid stream 45 was fed to the to the aerobic bioreactor 50, native microorganisms were cultivated. During the incubation, pure oxygen 51 (>96%) was injected into the liquid stream at a rate of 1.0 CFM per 1,000 gallons. The microorganisms metabolized the organic components of the feedstock into primary and secondary metabolomic byproducts including, but not limited to, plant growth factors, lipids and fatty acids, phenolics, carboxylic acids/organic acids, nucleosides, amines, sugars, polyols and sugar alcohol, and other compounds. Depending on its age, the liquid feedstock remained in the aerobic bioreactor 50 under gentle agitation (e.g., full turnover occurs 6 times per hour) for a minimum of 1 days to a maximum of about 8 days, and at a uniform minimum temperature of 55° C. The injection of pure oxygen instead of atmospheric or ambient oxygen resulted in a foam level of less than 6 inches. The aerobic bioreactor process parameters are provided in Table 5.

TABLE 5

Bioreactor process parameters

| Process Parameter | Range of Operational Parameters | | | Notes |
|---|---|---|---|---|
| Data collection Record | 1 minute to 30 minutes | | | How frequent the PLC records data |
| Hydraulic Retention time/ Residence time of material in reactors | 1 to 8 days | | | How long the material resides in the bioreactor |
| Bioreactor #1 Foam Level (inches) | <6 inches | | | 8,000 gallon tank |
| Bioreactor #2 Foam Level (inches) | <6 inches | | | 8,000 gallon tank |
| Bioreactor Blower (Hz) | 0 to 28 HZ | 0-46% | 0-46 CFM | 0-100 CFM 6 PSI |
| Bioreactor Foam Pump (Hz) | 0 to 60 HZ | 0-100% | 0-200 GPM | 0-200 GPM pump 7.5 HP pump |
| Bioreactor Mixing Pump (Hz) | 0 to 60 HZ | 0-100% | 0-750 GPM | 0-750 GPM pump 15 HP pump |

TABLE 5-continued

Bioreactor process parameters

| Process Parameter | Range of Operational Parameters | Notes |
|---|---|---|
| Oxygen Delivery | 1.0 CFM per 1,000 gallons | Injection by 2 micron sintered stainless steel spargers |
| Bioreactor ORP (mV) | −580 to +10 mV | Analytical tool |
| Bioreactor pH | 6.5 to 7.0 | Analytical tool |
| Bioreactor Temperature (° C.) | 45 to 70° C. | Analytical tool |
| pH peristaltic pump | 0-8 GPH | pH adjustment tool ON/OFF signal processed via 4-20 ma signal from Bioreactor pH probe |
| Influent to Bioreactor Pump PSI | 3 to 5 PSI | Pressure into the Pump |
| Discharge Foam Cutting Pump | 8 to 10 PSI | Pressure exiting the foam cutting spray nozzle at the top of the tank |

CFM, cubic feet per minute, GPH, gallons per hour; PSI, pounds per square inch; Hz, hertz; ORP, oxidation reduction potential: PLC, programmable logic controller The liquid product from the aerobic bioreactor 50 was managed in either of two ways. The first was a standard product process, while the second was a specialty product process. Both products were formulated 52 (primary formulation) with supplemental nitrogen (e.g., sodium nitrate, blood meal or hydrolyzed oilseeds) and potassium (e.g., sulfate of potash), and filtered directly into storage or packaging 70. For standard product process 62, the formulated liquid product was filtered 63 and transferred into a storage tank 70. The formulated standard product was stored under mildly aerobic conditions at a temperature ranging from about 45° C. (i.e., the temperature at which the product enters into the mesophilic state) to about 15-20° C. (i.e., room temperature). For the specialty product, formulated liquid product was flash pasteurized 55, filtered 60 via one or two filtration steps, and then further formulated (secondary formulation) 65 for special use, e.g., with custom microbes. The specialty product is then transferred into a storage or packaged 70. During storage 70, pure oxygen 72 (>96%) was injected into the formulated liquid product or the secondary formulation at a rate of 0.5 CFM per 10,000 gallons.

Liquid products were filtered using a vibratory stainless mesh followed by a cartridge filter vessel unit with operating parameters that include a 27 gallons per minute (GPM) inlet flow at 84 pounds per square inch (PSI) with 0 differential pressure at 27° C. In such embodiments, the cartridge filters are rated at 100 mesh with 99.9% absolute rating. For the particular embodiment depicted in FIG. 1, the formulated liquid product (the standard or the specialty following the pasteurization step 55) was completely homogenized with necessary amendments and cooled to ambient temperature (i.e., about 15-20° C.). For example, the amendments included sodium nitrate and potassium sulfate. The pH of the homogenized product was titrated to 5.50 with citric acid and then flushed through a vibratory stainless mesh screener at about 40 gallons per minute. The vibratory screener was fitted with a 200 mesh stainless steel screen. The filtered product was then pumped through a cartridge filter to a receiving vessel having an approximate 275 gallon tote or a 6,500 gallon storage tank. The operating parameters of the cartridge vessel included a differential pressure up to about 40 pounds per square inch (PSI), an inlet temperature up to about 85° F. (about 29.5° C.), and a vessel housing pressure up to about 40 PSI. The parameters for the pasteurization 55 and filtration 63, 60 are summarized in Table 6.

TABLE 6

Downstream processing after bioreactor

| Process Parameter | Range of Operational Parameters | Notes |
|---|---|---|
| Pasteurization | 65 to 100° C. 5 to 60 minutes | Steam injection |
| Filtration Step 1 | 88 to 74 micron | vibratory stainless mesh |
| Filtration Step 2 | 50 to 74 micron | pressure filter vessel |

For storage 70, storage vessels were maintained under mild aerobic conditions at a pH from about 6.5 to about 7.0. The headspaces of the storage tanks were purged with sterile air and agitated to ensure thorough mixing of the air. While the product was indefinitely stable under these conditions, the storage also served as a maturation stage with mesophilic bacteria converting ligand and cellulosic material into plant-useful compounds. Prior to bulk shipment or packaging 70, a third filtration step was applied. Bottles were sealed with a membrane cap to permit air circulation in the headspace of the containers. The membranes were hydrophobic with pores having a very small size (less than about 2 microns) such that material would not leak even when the containers were inverted. The small size of the pores also significantly reduced the potential for microbial contamination from the environment. The storage parameters for certain aspects of the storage and filtration are shown in Table 7.

TABLE 7

Storage parameters

| Process Parameter | Range of Operational Parameters | Notes |
|---|---|---|
| Axial Turbine mixing | 50-68 RPM | 42 inch axial turbine shaft, 1.5 HP 1 to 1.6 turnovers per minute Interval programmed mixing cycle |
| Oxygen | 0.5 CFM per 10,000 | Injection by 2 micron sintered |

TABLE 7-continued

Storage parameters

| Process Parameter | Range of Operational Parameters | Notes |
|---|---|---|
| Delivery Filtration Step 3 | gallons 50-74 micron | stainless steel spargers Final filtration prior to shipment QC step hybrid sieve test |

HP, horsepower; RPM, revolutions per minute; QC, quality control

In certain embodiments, quality control measures were included to reduce the risk of pathogen reemergence. For instance, the above-described fertilizer production process is a closed system to safeguard against accidental contamination with raw manure. In such aspects, quality control included three major quality assurance steps: 1) raw manure storage was segregated in closed tanks away from the rest of the manufacturing process; 2) the product was transported from formulation/flash pasteurization step directly to storage without exposure; and 3) bulk packages (totes/tankers) and bottles were loaded in an area distant from manure storage.

Example 2. Bioreactor Kinetics During ATAB

The rate of organic matter decomposition of during ATAB is adversely impacted by increasing foaming in the bioreactor, which interferes with the oxygen supply. In turn, inadequate oxygen supply to the liquid stream during ATAB makes less oxygen available and reduces efficiency of organic matter decomposition. The oxygen reduction potential (ORP) can be used to measure the efficiency of oxygen delivery, which results in increased oxidation of compounds in the liquid stream and lowering of the ORP value. As such, ORP can be used to measure organic matter decomposition kinetics in the bioreactor.

To compare the ATAB kinetics of pure oxygen versus atmospheric oxygen, a bioreactor utilizing pure oxygen delivery was compared a bioreactor with utilizing ambient air. Five separate ATABs were carried out for 80-90 hours in a bioreactor equipped with 2 micron sintered stainless steel spargers that injected the liquid stream with pure oxygen at a rate of 1.0 CFM per 1,000 gallons (see FIGS. 3A-3E). For comparison, five separate ATABs were carried out for 80-90 hours in a bioreactor equipped with a jet aeration device to supply ambient air to the liquid stream (see FIGS. 2A-2E). As shown in FIGS. 2A-E and 3A-E, the average reaction rate over time was significantly lower in the bioreactor delivering ambient air as compared to the bioreactor delivering pure oxygen. Thus, increased rate of organic matter decomposition was achieved with the delivery of pure oxygen as compared to ambient air.

In another test, three separate runs in a bioreactor utilizing pure oxygen delivery was compared to three runs in a bioreactor supplying ambient air. For this study, all feedstock manure was sourced from the same location. First, the feedstock material was homogenized (i.e., vigorously mixed and macerated) with water to elevate moisture to a level of between about 87% and 88%, and brought to a temperature of at least 65° C. for a minimum of 1 hour using direct steam injection. Citric acid was added to the resulting slurry to reduce the pH to 6.5.

In the next step, the slurry was separated in a decanter centrifugation. The centrifugation conditions were consistent with comparable centrate produced in each batch. The decanter centrifuge was run at 20-25 GPM input speed and produced a centrate with a moisture content of between 94% and 96% with a pH of between 6.5 and 6.7.

The centrate was then processed in the aerobic bioreactors with a turn-over rate of 15-17× per hour with pH controlled between 6.9 and 7.0. In the ambient air runs, the bioreactor was supplied with between 24 and 36 CFM of ambient air. For the oxygen-enriched runs, the bioreactor was supplied with between about 3 and 6 CFM of pure gaseous oxygen. Similar volumes of liquid, between about 12,500 to about 13,000 gallons of liquid was used in the bioreactors for all six runs. The minimum residence time in the bioreactors was 72 hours at 55° C.

Figure 4:
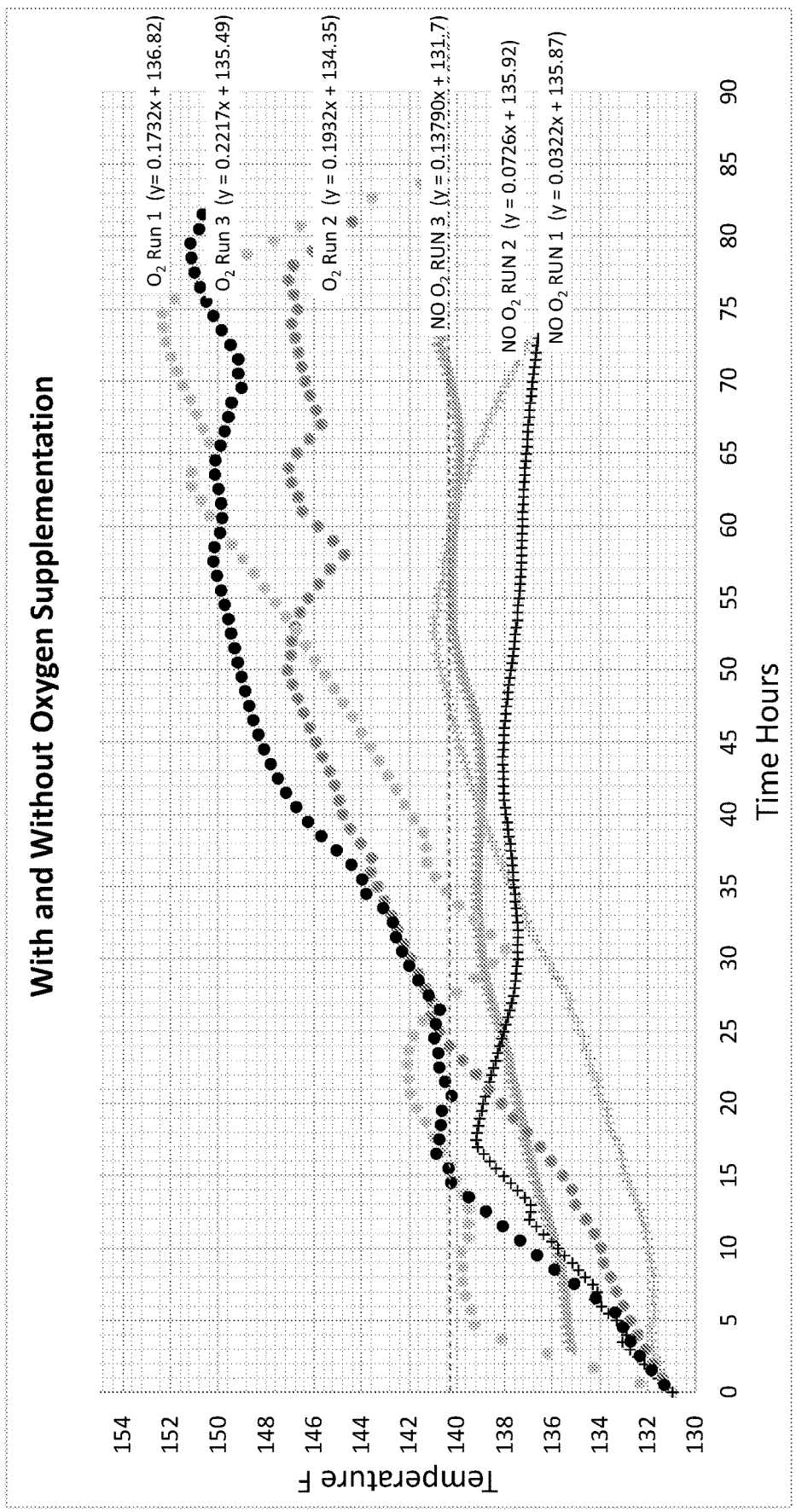
FIG. 4 is a graph comparing ATAB kinetics in bioreactors supplied with enriched oxygen versus ambient air. The y-axis depicts temperature in Fahrenheit, and the x-axis depicts time in hours. The circles represent the oxygen-enriched runs, whereas the "+" represents that ambient air runs.

The results are summarized in FIG. 4. All three oxygen-enriched runs reached a higher bioreactor temperature than the runs in which ambient air was supplied.

Example 3. Bioreactor Foam Production During ATAB

The level of foam produced during ATAB performed in a bioreactor utilizing atmospheric oxygen delivery was compared to the level foam produced in a bioreactor with a pure oxygen or oxygen enriched delivery system as disclosed herein. The liquid fertilizer production process was carried out for two different bioreactor oxygen delivery systems. In Process A, the production process was carried out as described in Example 1. Two bioreactors used in sequence facilitated the ATAB. Each bioreactor in Process A was equipped with 2 micron sintered stainless steel spargers that injected the liquid stream with pure oxygen at a rate of 1.0 CFM per 1,000 gallons. In Process B, the bioreactors were each equipped with a jet aeration device to supply ambient air to the liquid stream. As shown in Table 8, the delivery of pure oxygen significantly reduced the foam level in the bioreactors as compared to ambient air delivery.

TABLE 8

Bioreactor Foam Levels

| Process | Bioreactor | Foam Level | Notes |
|---|---|---|---|
| A (pure O$_2$) | Bioreactor #1 | Foam Level <6 inches | 8,000 gallon tank |
| | Bioreactor #2 | Foam Level <6 inches | 8,000 gallon tank |
| B (ambient air) | Bioreactor #1 | Foam Level 5-6 feet | 8,000 gallon tank |
| | Bioreactor #2 | Foam Level 5-6 feet | 8,000 gallon tank |

Example 4. Identification of Thermophiles and Mesophiles in the Liquid Stream During ATAB The identity of thermophiles and mesophiles present in the liquid stream during the ATAB was determined by sampling the liquid stream material in the bioreactor at peak growth conditions. The sample was serially diluted with tryptic soy broth, and 750 uL of each diluted sample was dispensed into a sterile petri dish over which 20 mL of molten tryptic soy agar was poured. The petri dishes were each incubated at ambient temperature or 55° C. for 18 hours. Direct colonies were plucked from the Petri dishes. For each colony, 16S rRNA was extracted and sequenced according to art-standard techniques. Microorganisms were identified by conducting a BLAST search of the sequencing date. The results are summarized in Table 9.

TABLE 9

Identification of Thermophiles and Mesophiles.

| Microbe | Accession # | Incubation Temperature AMB or 55 C. | Agronomic Value | Articles/Notes |
|---|---|---|---|---|
| *Bacillus isronensis* strain B3W22 | NR_115952 | AMB | | https://www.sciencedaily.com/releases/2009/03/090318094642.htm |
| *Bacillus kokeshiiformis* | NR_133975 | 55 C. | | http://www.microbiologyresearch.org/docserver/fulltext/ijsem/64/8/2668_ijs059329.pdf?expires=1528294360&id=id&accname=guest&checksum=112E48BFFF60A918D5F181BD60E15923 |
| *Bacillus licheniformis* | JX237838 | 55 C. | It produces a variety of extracellular enzymes that are associated with the cycling of nutrients in nature. | Scientists are currently exploring its ability to degrade feathers for agricultural purposes. Feathers contain high amounts of non-digestible proteins, but researchers hope that, through fermentation with B licheniformis, they can use waste feathers to produce cheap and nutritious feather meal to feed livestock. |
| *Bacillus licheniformis* strain DSM 13 | NR_118996 | AMB | Exploring its ability to degrade feathers for agricultural purposes. Feathers contain high amounts of non-digestible proteins, but researchers hope that, through fermentation with *B. licheniformis*, they can use waste feathers to produce cheap and nutritious feather meal to feed livestock. | Gram-positive, mesophilic bacterium. Its optimal growth temperature is around 50° C., though it can survive at much higher temperatures |
| *Bacillus paralicheniformis* | NR_137421 | 55 C. | | |
| *Bacillus paralicheniformis* strain KJ-16 | NR_137421 | AMB | | Gram-stain-positive, facultatively anaerobic, motile, rod-shaped, endospore-forming bacterium |
| *Coryebacterium efficiens* strain YS-314 | NR_102865 | AMB | Fermentation production of Monosodium Glutamate (MSG) | *C. efficiens* is of specific interest to companies involved in commercial production of amino acids because of its thermostability. The effectiveness of this species' ability to grow efficiently at high temperatures has led to current genome sequencing to understand the genomic characteristics contributing to this organism's thermostability. Scientists believe the key underlying *C. efficiens* thermostability will be invaluable for the development of thermostable protein synthesis. |
| *Idiomarina indica* strain SW104 | NR_109519 | AMB | | |
| *Oceanobacillus caeni* strain S-11 | NR_041533 | AMB | | Gram-positive, rod-shaped, spore-forming bacterium |
| *Solibacillus silvestris* strain HR3-23 | NR_028865 | AMB | Supposedly not found on Earth and highly resistant to ultra-violet radiation. | *S. isronensis* was isolated from cryotubes that were used to collect air samples from high altitudes, and *S. kalamii* was found in an air filter from the International Space Station. |
| *Sporosarcina koreensis* strain F73 | NR_043526 | AMB | | |
| *Sporosarcina luteola* strain NBRC 105378 | NR_114283 | AMB | | |
| *Sporosarcina newyorkensis* strain 6062 | NR_117567 | AMB | | gram-positive, endospore-forming rod were recovered from clinical specimens in New York State, USA, and from raw milk in Flanders, Belgium |
| *Sporosarcina thermotolerans* strain CCUG 53480 | NR_116956 | AMB | | Aerobic mesophiles. Some species, such as *S. ureae* have the enzyme urease and are thus able to break down urea. The species forms the highest population densities in soils that are subject to influence of urine. |
| *Ureibacillus thermosphaericus* | NR_040961 | 55 C. | | These results suggest that the bacterium degrades minor but more toxic compounds or phenolic compounds in the WHW hydrolysates. The combination of bacterial and overliming treatments of hydrolysates minimized significantly the decrease in ethanol production rate by *E. coli* KO11 as fermentation proceeded. Because the bacterium grows rapidly and does not consume sugars, our biological detoxification should be useful for bioethanol production from acid hydrolysates of lignocelluloses. https://www.sciencedirect.com/science/article/pii/S1389172308701555 |

AMB, ambient temperature.

The present invention is not limited to the embodiments described and exemplified herein. It is capable of variation and modification within the scope of the appended claims.

We claim:

1. A process for manufacturing an organic fertilizer product from animal waste, the process comprising:
   (a) adjusting the pH of the animal waste to about 5 to about 8 to produce a stabilized animal waste composition;
   (b) adjusting moisture content of the animal waste composition to at least about 75 wt % to produce an aqueous slurry;
   (c) separating a substantially solid component and a substantially liquid component of the aqueous slurry; and
   (d) subjecting the substantially liquid component to an autothermal thermophilic aerobic bioreaction in a bioreactor that comprises: (i) delivery of pure oxygen or oxygen enriched air to the substantially liquid component to maintain the substantially liquid component under aerobic conditions suitable for the growth of thermophilic bacteria for a first period of time; and (ii) maintaining the substantially liquid component at a temperature suitable for the growth of thermophilic bacteria for a second period of time, wherein production of foam in the bioreactor is reduced by at least about 50% compared to foam production in a bioreactor in which atmospheric oxygen is delivered; and
   wherein the pure oxygen or oxygen enriched air comprises at least 30% oxygen, and wherein the stabilized animal waste composition, the aqueous slurry and the substantially liquid component are maintained at a pH of at about 5 to about 8 throughout the process.

2. The process of claim 1, wherein the animal waste comprises poultry manure.

3. The process of claim 2, wherein the poultry manure is chicken manure.

4. The process of claim 1, further comprising:
   (e) subjecting the substantially solid component to drying to adjust the moisture content of the substantially solid component to less than about 15% to produce a dried solid product.

5. The process of claim 1, further comprising subjecting the stabilized animal waste composition, the aqueous slurry, or both the stabilized animal waste composition and aqueous slurry to mixing or chopping.

6. The process of claim 1, further comprising delivery of pure oxygen or oxygen enriched air to the aqueous slurry for a third period of time to reduce the concentration of anaerobic compounds in the aqueous slurry, wherein the third period of time is at least about 1 hour so that the aqueous slurry comprises a residual dissolved oxygen concentration of at least about 1 parts per million, and wherein the anaerobic compounds comprise hydrogen sulfide.

7. The process of claim 1, wherein the pure oxygen or oxygen enriched air is delivered by injection via one or more spargers having a pore grade in the range from about 1 micron to about 3 microns.

8. The process of claim 1, wherein:
   (a) the pure oxygen or oxygen enriched air is injected into the substantially liquid component at a rate of about 0.5 CFM to about 1.5 CFM per 1,000 gallons; or
   (b) the pure oxygen or oxygen enriched air is injected into the aqueous slurry at a rate of about 0.25 CFM to about 1.5 CFM per 10,000 gallons; or
   (c) both (a) and (b).

9. The process of claim 1, wherein step (b) comprises adjusting the moisture content of the animal waste composition to between about 80 wt % and about 92 wt % to produce an aqueous slurry.

10. The process of claim 1, wherein:
    (a) the aqueous slurry is heated to between about 50° C. to about 80° C. before the separating step; or
    (b) wherein the autothermal thermophilic aerobic bioreaction comprises heating the substantially liquid component to a temperature of at least about 45° C. for the second period of time; or
    (c) both (a) and (b).

11. The process of claim 1, wherein both the first period of time and the second period of time are at least about 1 day.

12. The process of claim 1, further comprising:
    prior to step (d), subjecting the substantially liquid component to an initial autothermal aerobic mesophilic reaction that comprises (i) delivery of pure oxygen or oxygen enriched air to the substantially liquid component to maintain the substantially liquid component under aerobic conditions suitable for the growth of mesophilic bacteria; and (ii) maintaining the substantially liquid component at a temperature suitable for the growth of mesophilic bacteria; and
    wherein the initial autothermal aerobic mesophilic reaction is maintained for at least about 1 hour.

13. The process of claim 1, wherein the production of foam in the bioreactor is reduced by at least about 75% compared to foam production in a bioreactor in which atmospheric oxygen is delivered.

14. A process for manufacturing a nutritional composition from animal waste, the process comprising:
    (a) adjusting the pH of the animal waste to less than about 7.5 to produce a stabilized animal waste composition;
    (b) adjusting moisture content of the stabilized animal waste to at least about 80 wt % to produce an aqueous animal waste composition;
    (c) separating a solid component and a liquid component of the aqueous animal waste composition; and
    (d) subjecting the separated liquid component to an autothermal thermophilic aerobic bioreaction (ATAB) for a first pre-determined time wherein:
       (i) the ATAB of the separated liquid component occurs in one or more bioreactors comprising a pure oxygen or oxygen enriched air delivery system, wherein the pure oxygen or oxygen enriched air comprises at least 30% oxygen, wherein production of foam in each of the one or more bioreactors is reduced by at least about 75% compared to foam production in a bioreactor in which atmospheric oxygen is delivered, and;
       (ii) the delivery system injects the pure oxygen or oxygen enriched air into the separated liquid component to maintain the separated liquid component under aerobic conditions suitable for the growth of thermophilic bacteria; and
       (iii) the temperature of the separated liquid component in the bioreactor is maintained at a temperature between about 45° C. to about 75° C.; and
    wherein the stabilized animal waste composition, the aqueous animal waste composition and the separated liquid component are maintained at a pH of less than about 7.5 throughout the process, wherein the bioreactor comprises a level of foam that is less than about 1 foot for the first pro-determined time, and wherein the first pre-determined time is at least about 1 day.

15. The process of claim 14, wherein:
(a) the pure oxygen or oxygen enriched air is injected into the separated liquid component at a rate of about 0.5 CFM to about 1.5 CFM per 1,000 gallons; or
(b) pure oxygen or oxygen enriched air is delivered to the aqueous animal waste composition for a second predetermined time, wherein the second predetermined time is at least about 15 minutes and the delivery of pure oxygen or oxygen enriched air is at a rate of about 0.25 CFM to about 1.5 CFM per 10,000 gallons; or
(c) both (a) and (b).

16. The process of claim 14, wherein the temperature of the separated liquid component in the bioreactor is maintained at a temperature of at least about 60° C. for the first predetermined time.

17. The process of claim 14, further comprising:
prior to step (d), subjecting the substantially liquid component to an initial autothermal aerobic mesophilic reaction that comprises (i) delivery of pure oxygen or oxygen enriched air to the substantially liquid component to maintain the substantially liquid component under aerobic conditions suitable for the growth of mesophilic bacteria; and (ii) maintaining the substantially liquid component at a temperature suitable for the growth of mesophilic bacteria; and
wherein the initial autothermal aerobic mesophilic reaction is maintained for at least about 1 hour.

\* \* \* \* \*